US009929654B2

(12) United States Patent
Ferdowsi et al.

(10) Patent No.: US 9,929,654 B2
(45) Date of Patent: Mar. 27, 2018

(54) HIGH VOLTAGE GAIN DC/DC POWER ELECTRONIC CONVERTERS

(71) Applicant: The Curators of the University of Missouri, Columbia, MO (US)

(72) Inventors: Mehdi Ferdowsi, Washington, MO (US); Venkata Anand Kishore Prabhala, Rolla, MO (US)

(73) Assignee: The Curators of the University of Missouri, Columbia, MO (US)

( * ) Notice: Subject to any disclaimer, the term of this patent is extended or adjusted under 35 U.S.C. 154(b) by 0 days.

(21) Appl. No.: 15/239,185

(22) Filed: Aug. 17, 2016

(65) Prior Publication Data

US 2017/0054364 A1 Feb. 23, 2017

Related U.S. Application Data

(60) Provisional application No. 62/206,035, filed on Aug. 17, 2015, provisional application No. 62/206,041, filed on Aug. 17, 2015.

(51) Int. Cl.
*H02M 3/158* (2006.01)
*H02M 3/07* (2006.01)
*H02M 3/335* (2006.01)
*H02M 1/00* (2006.01)

(52) U.S. Cl.
CPC .......... *H02M 3/1584* (2013.01); *H02M 3/07* (2013.01); *H02M 3/158* (2013.01); *H02M 3/073* (2013.01); *H02M 3/335* (2013.01); *H02M 2001/0064* (2013.01)

(58) Field of Classification Search
CPC ........ H02M 3/07; H02M 3/158; H02M 3/073; H02M 3/335; H02M 2001/0064; H02M 3/1584
See application file for complete search history.

(56) References Cited

U.S. PATENT DOCUMENTS 7,049,793 B2 * 5/2006 Itoh ...................... H02M 3/158
    323/222
8,723,487 B2 * 5/2014 Pahlevaninezhad .... H02M 1/42
    323/207
8,817,506 B2 * 8/2014 Shimomugi ........ H02M 3/1584
    323/272

(Continued)

OTHER PUBLICATIONS

S. Jain and V. Agarwal, "A single-stage grid connected inverter topology for solar PV systems with maximum power point tracking," IEEE Trans. on Power Electronics, vol. 22, No. 5, pp. 1928-1940, Sep. 2007.

(Continued)

*Primary Examiner* — Kyle J Moody
(74) *Attorney, Agent, or Firm* — Senniger Powers LLP

(57) ABSTRACT

A DC/DC power converter provides high voltage gain using integrated boost and voltage multiplier (VM) stages. The boost cell operates according to a switching sequence to alternately energize and discharge a primary winding. A VM cell electrically coupled to the primary winding of the boost cell charges a multiplier capacitor to a DC output voltage greater than the input voltage when the primary winding is energized and discharges the multiplier capacitor when primary winding is discharged.

14 Claims, 18 Drawing Sheets

(56) References Cited

U.S. PATENT DOCUMENTS

| | | | | |
|---|---|---|---|---|
| 8,896,230 | B1* | 11/2014 | Zhang | G09G 3/36 |
| | | | | 315/224 |
| 9,112,430 | B2* | 8/2015 | Elpel | H02M 3/1584 |
| 2011/0292690 | A1* | 12/2011 | Liang | H02M 3/155 |
| | | | | 363/21.12 |
| 2016/0322898 | A1* | 11/2016 | Bianco | H02M 1/4225 |
| 2017/0012532 | A1* | 1/2017 | Tago | H02M 3/158 |

OTHER PUBLICATIONS

X. Kong and A. M. Khambadkone, "Analysis and implementation of a high efficiency, interleaved current-fed full bridge converter for fuel cell system," IEEE Trans. on Power Electronics, vol. 22, No. 2, pp. 543-550, Mar. 2007.

C. Liu and J. S. Lai, "Low frequency current ripple reduction technique with active control in a fuel cell power system with inverter load," IEEE Trans. on Power Electronics, vol. 22, No. 4, pp. 1429-1436, Jul. 2007.

Esam H. Ismail, Mustafa A. Al-Saffar, Ahmad J. Sabzali, and Abbas A. Fardoun, "A Family of Single-Switch PWM Converters With High Step-Up Conversion Ratio," IEEE Trans. on Circuits and Systems—I: Regular Papers, vol. 55, No. 4, pp. 1159-1171, May 2008.

R. W. Erickson and D. Maksimovic, Fundamentals of Power Electronics, 2nd ed. Norwell, MA: Kluwer Academic Publishers, pp. 77-93, 2001.

W. Li, and, and X. He, "A family of interleaved DC-DC converters deduced from a basic cell with winding-cross-coupled inductors (WCCIs) for high step-up or step-down conversions," IEEE Trans. on Power Electronics, vol. 23, No. 4, pp. 1791-1801, Jul. 2008.

W. Li, and X. He, "An interleaved winding-coupled boost converter with passive lossless clamp circuits," IEEE Trans. on Power Electronics, vol. 22, No. 4, pp. 1499-1507, Jul. 2007.

W. Li, Y. Zhao, Y. Deng, and X. He, "Interleaved converter with voltage multiplier cell for high step-up and high-efficiency conversion," IEEE Trans. on Power Electronics, vol. 25, No. 9, pp. 2397-2408, Sep. 2010.

Yi-Ping Hsieh Jiann-Fuh Chen, Tsorng-Juu Liang, and Lung-Sheng Yang, "A novel high step-up DC-DC Converter for a microgrid system," IEEE Trans. on Power Electronics, vol. 26, No. 4, pp. 1127-1136, Apr. 2011.

R. Xie, W. Li, Y. Zhao, J. Zhao, X. He, and F. Cao, "Performance analysis of isolated ZVT interleaved converter with winding-cross-coupled inductors and switched-capacitors," in Proc. IEEE Energy Conversion Congress and Exposition (ECCE), Atlanta, USA, 2010, pp. 2025-2029.

Wuhua Li, Weichen Li, Xiangning He, David Xu, and Bin Wu, "General derivation law of nonisolated high-step-up interleaved converters with built-in transformer," IEEE Trans. on Industrial Electronics, vol. 59, No. 3, pp. 1650-1661, Mar. 2012.

Kuo-Ching Tseng, Chi-Chih Huang, and Wei-Yuan Shih, "A high step-up converter with a voltage multiplier module for a photovoltaic system," IEEE Trans. on Power Electronics, vol. 28, No. 6, pp. 3047-3057, Jun. 2013.

Wuhua Li, Yi Zhao, Jiande Wu, and Xiangning He, "Interleaved high step-up converter with winding-cross-coupled inductors and voltage multiplier cells," IEEE Trans. on Power Electronics, vol. 27, No. 1, pp. 133-143, Jan. 2012.

Kuo-Ching Tseng, and Chi-Chih Huang, "High step-up high-efficiency interleaved converter with voltage multiplier module for renewable energy system," IEEE Trans. on Industrial Electronics, vol. 61, No. 3, pp. 1311-1319, Mar. 2014.

Kuo-Ching Tseng, and Chi-Chih Huang, "A high step-up passive absorption circuit used in non-isolated high step-up converter," in Proc. IEEE Applied Power Electronics Conference and Exposition (APEC), Long Beach, USA, 2013, pp. 1966-1971.

K. Gummi and M. Ferdowsi, "Synthesis of double-put dc-dc converters using single pole triple throw switch as a building block," in Proc. IEEE Power Electronics Specialists Conf. (PESC), Rhodes, Greece, 2008, pp. 2819-2823.

V. A. K. Prabhala, D. Somayajula and M. Ferdowsi, "Power sharing in a double-input buck converter using dead-time control", in Proc. IEEE Energy Conversion Congress and Exposition (ECCE), San Jose, USA, 2009, pp. 2621-2626.

Sanghyuk Lee, Pyosoo Kim, and Sewan Choi. "High step-up soft-switched converters using voltage multiplier cells," IEEE Trans. on Power Electronics, vol. 28, No. 7, pp. 3379-3387, Jul. 2013.

Chung-Ming Young, Ming-Hui Chen, Tsun-An Chang, Chun-Cho Ko, and Kuo-Kuang Jen, "Cascade Cockcroft-Walton Voltage Multiplier Applied to Transformerless High Step-Up DC-DC Converter," IEEE Trans. on Industrial Electronics, vol. 60, No. 2, pp. 523-537, Feb. 2013.

John F. Dickson, "On-chip high-voltage generation in MNOS integrated circuits using an improved voltage multiplier technique," IEEE Journal of Solid-State Circuits, vol. 11, Issue: 3, pp. 374-378, Jun. 1976.

\* cited by examiner

FIG. 12

CHARGE FIRST AND SECOND STORAGE COMPONENT, THE COMPONENTS ELECTRICALLY CONNECTED BY A FIRST VM STAGE, USING A SOURCE DURING FIRST MODE OF OPERATION THAT REVERSE BIASES FIRST VM STAGE
356

↓

FORWARD BIAS FIRST VM STAGE AND DISCHARGE FIRST STORAGE COMPONENT THROUGH FIRST VM STAGE DURING SECOND MODE OF OPERATION THAT REVERSE BIASES SECOND VM STAGE
359

↓

FORWARD BIAS SECOND VM STAGE DURING THIRD MODE OF OPERATION TO DISCHARGE SECOND STORAGE COMPONENT THROUGH SECOND VM STAGE AND REVERSE BIAS FIRST VM STAGE
362

↓

SUPPLY OUTPUT TO LOAD BY OUTPUT CAPACITOR ELECTRICALLY CONNECTED TO VM STAGES BY FORWARD BIASED OUTPUT DIODE TO CHARGE OUTPUT CAPACITOR DURING THIRD MODE OF OPERATION
365

HIGH VOLTAGE GAIN DC/DC POWER ELECTRONIC CONVERTERS

CROSS-REFERENCE TO RELATED APPLICATIONS

This application claims the benefit of U.S. Provisional Application Ser. No. 62/206,035, filed Aug. 17, 2015, and U.S. Provisional Application Ser. No. 62/206,041, filed Aug. 17, 2015, the entire disclosures of which are incorporated herein by reference for all purposes.

BACKGROUND

With increased penetration of renewable energy sources and energy storage, high gain DC/DC power electronic converters find increased applications in, for example, green energy systems. They can be used to interface low voltage sources like fuel cells, photovoltaic (also called PV or solar) panels, batteries, and the like with a high voltage (e.g., 400 V) bus in a DC microgrid system. These converters also find applications in different types of electronic equipment such as high-intensity-discharge (HID) lamps for automobile headlamps, servo-motor drives, X-ray power generators, computer periphery power supplies, and uninterruptible power supplies (UPS).

Conventional DC/DC converter topologies feature varying levels of integration between commonly used topologies, such as boost and flyback topologies, in order to provide a high-gain. However, each proposed topology is deficient in requiring at least one of the following: a large inductor ripple current due to a high duty cycle requirement, or a discontinuous current input.

To achieve high voltage gains, classical boost and buck-boost converters require large switch duty ratios. Large duty cycles result in high current stress in the boost switch. The maximum voltage gain that can be achieved is constrained by the parasitic resistive components in the circuit and the efficiency is drastically reduced for large duty ratios. There are diode reverse recovery problems because the diode conducts for a short period of time. Also the high current and output voltage along with large current ripples would further degrade the efficiency of the converter. Typically high frequency transformers or coupled inductors are used to achieve high voltage conversion ratios. The transformer design is complicated and the leakage inductances increase for achieving larger gains, as the design requires higher number of winding turns. Increased leakage inductance leads to voltage spikes across the switches and voltage clamping techniques are required to limit voltage stresses on the switches. Implementing these design features results in a more complicated design.

Therefore, there is a need for a high-gain DC/DC power electronic converter that is energy efficient and cost-effective without the limitations as described above and that benefits from a continuous input current.

SUMMARY

Briefly, aspects of the present invention provide high gain DC/DC power conversion. In an aspect, a non-isolated DC/DC power converter provides high voltage gain using integrated voltage multiplier (VM) stages. And a topology embodying aspects of the invention comprises a boost cell integrated with a VM cell. Advantageously, such a power converter permits better integration of renewable energy sources into a DC microgrid without requiring the complicated design features of previous approaches. Aspects of the invention further permit provide for a converter that provides lower input current ripple while preventing the rapid increase of output impedance in the event the number of VM stages is increased, resulting in increased efficiency, greater control over regulating output voltage, and greater system reliability.

A high gain DC/DC power converter embodying aspects of the invention has an input terminal adapted for connection to a power source and an output terminal adapted for connection to a load. The DC/DC power converter includes a boost cell electrically connected to the input terminal for receiving a DC input voltage from the input terminal. The boost cell has a switch, a primary winding, and a boost diode and operates the switch according to a switching sequence to alternately energize the primary winding to the input voltage and to discharge the primary winding through the boost diode. A voltage multiplier (VM) cell electrically connected to the boost cell has a secondary winding, a multiplier capacitor, and a multiplier diode. The secondary winding of the VM cell is coupled to the primary winding of the boost cell for charging the multiplier capacitor through the multiplier diode to a DC output voltage greater than the input voltage when the primary winding is energized and discharging the multiplier capacitor when primary winding is discharged. The converter also includes an output capacitor electrically connected to the VM cell for providing an electrical output to the output terminal. The output capacitor is charged to the output voltage by the multiplier capacitor when the multiplier capacitor is discharged.

In an aspect, a system provides DC power to a DC distribution network connected to an AC grid network using a power converter network. The system includes a DC generation system providing generated power and a power converter network receiving the power from the DC generation system. The DC generation system has a plurality of generation modules and provides the generated power via an output terminal of each generation module. And the power converter network has a plurality of power converters each connected to the output terminal of one of the generation modules. The system also includes a DC distribution network connected in parallel with the power converters that receives the power from the power converter network for distribution to an AC grid network. According to this aspect, the power converter network is configured to provide uninterrupted DC power to the DC distribution network independent of the status of the AC grid network.

A non-isolated DC/DC power converter embodying aspects of the invention provides high voltage gain using integrated voltage multiplier (VM) stages. The power converter has first and second boost stages and first and second VM stages. The first boost stage performs, according to a first control signal, a first sequence that includes a first storing sequence and a first releasing sequence. The second boost stage, which is electrically connected with the first boost stage, performs, according to a second control signal, a second sequence that is distinct from the first sequence and that includes a second storing sequence and a second releasing sequence. The first VM stage is electrically connected in parallel between the first boost stage and the second boost stage and includes a first diode and a first capacitor. The second VM stage is electrically connected in series between the first diode and the first boost stage and includes a second diode and a second capacitor. According to an aspect of the invention, the first VM stage receives energy from the first boost stage during the first storing sequence and the second VM stage receives energy from the second boost stage and from the first capacitor of the first VM stage during the second releasing sequence.

In another aspect, a method provides non-isolated DC/DC power using integrated VM stages. The method includes charging first and second storage components from an input source during a first mode of operation. The first storage component is electrically connected to the second storage component by a first VM stage and the first mode of operation reverse biases the first VM stage. The method also includes forward biasing the first VM stage during a second mode of operation to discharge the first storage component through the forward biased first VM stage and to reverse bias a second VM stage electrically connected to the first VM stage. In addition, the method includes forward biasing the second VM stage during a third mode of operation to discharge the second storage component through the forward biased second VM stage and to reverse bias the first VM stage. Further, the method includes supplying an output voltage to a load by an output capacitor. In this aspect, the output capacitor is electrically connected to the first and second VM stages by an output diode that is forward biased during the third mode of operation for charging the output capacitor.

Other objects and features will be in part apparent and in part pointed out hereinafter.

BRIEF DESCRIPTION OF THE DRAWINGS

FIG. 12 depicts a method for providing non-isolated DC/DC power using integrated VM stages according to an embodiment of the present invention.

Corresponding reference characters indicate corresponding parts throughout the drawings.

DETAILED DESCRIPTION

Aspects of the present invention relate to the fields of power electronic converters, more specifically, to DC/DC converters for use with energy generation modules. The new and improved high-gain DC/DC converter described herein may be employed with a photovoltaic (PV) panel for solar generation, or with a turbine for wind generation, resulting in high voltage gain during renewable energy generation. The approaches illustrated herein avoid excessive distribution of power electronic circuitry and do not require large electrolytic capacitors. Therefore, advantages are realized, including lower overall system costs, simplicity, improved reliability, and a faster return on investment.

Figure 1:
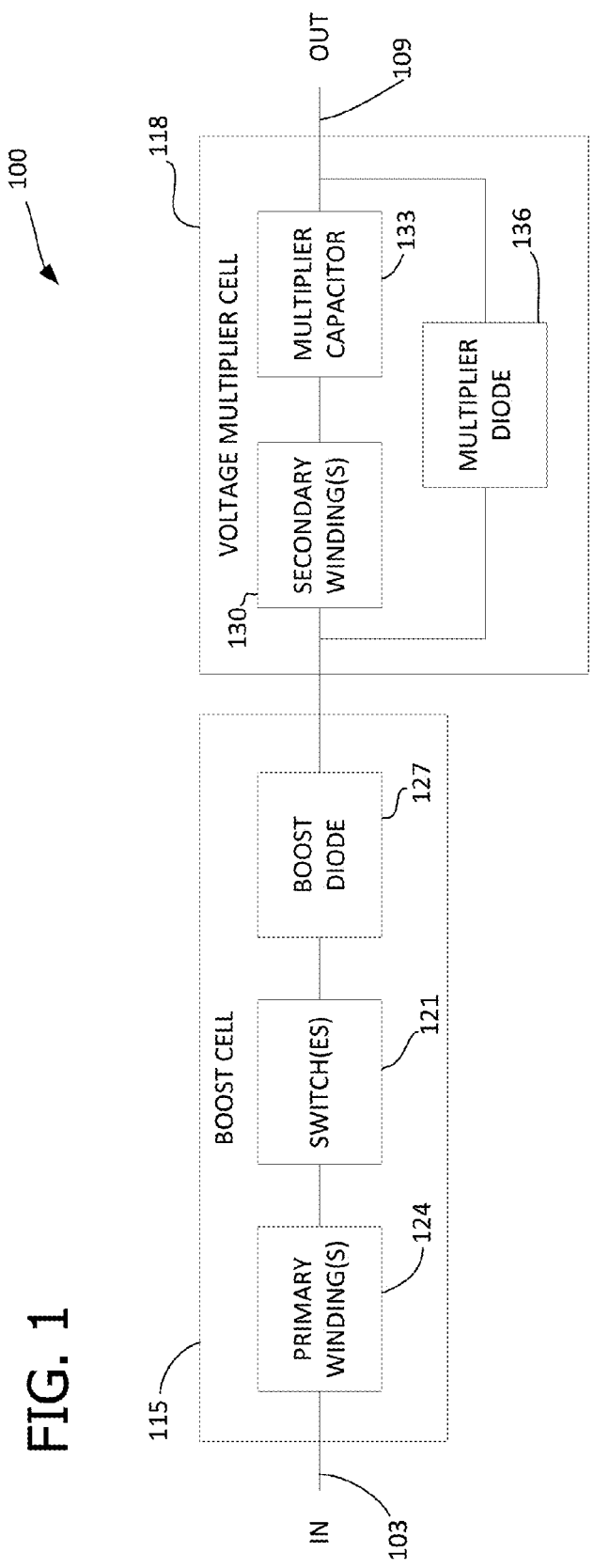
FIG. 1 is a block diagram of a converter topology with a boost topology integrated with a voltage multiplier (VM) topology according to an embodiment of the present invention.

FIG. 1 is a block diagram illustrating an exemplary topology for a converter having a boost topology integrated with a voltage multiplier (VM) topology, according to an embodiment of the present invention. FIG. 1 illustrates a high gain DC/DC power converter 100 having an input terminal 103 adapted for connection to a power source 106 (see FIG. 2) and an output terminal 109 adapted for connection to a load 112 (see FIG. 2). The converter 100 has a boost cell 115 electrically connected to the input terminal 103 for receiving a DC input voltage from the input terminal 103 and cascaded with a VM cell 118.

In the illustrated embodiment, the boost cell 115 includes a switch 121, a primary winding 124, and a boost diode 127. The boost cell 115 operates the switch 121 according to a switching sequence to alternately energize the primary winding 124 to the input voltage and to discharge the primary winding 124 through the boost diode 127.

The high gain DC/DC power converter 100 further comprises the VM cell 118 electrically connected to the boost cell 115. As shown, VM cell 118 comprises a secondary winding 130, a multiplier capacitor 133, and a multiplier diode 136. The secondary winding 130 of VM cell 118 is coupled to primary winding 124 of boost cell 115 for charging the multiplier capacitor 133 through the multiplier diode 136 to a DC output voltage greater than the input voltage when the primary winding 124 is energized and discharging the multiplier capacitor 133 when primary winding 124 is discharged.

Figure 2:
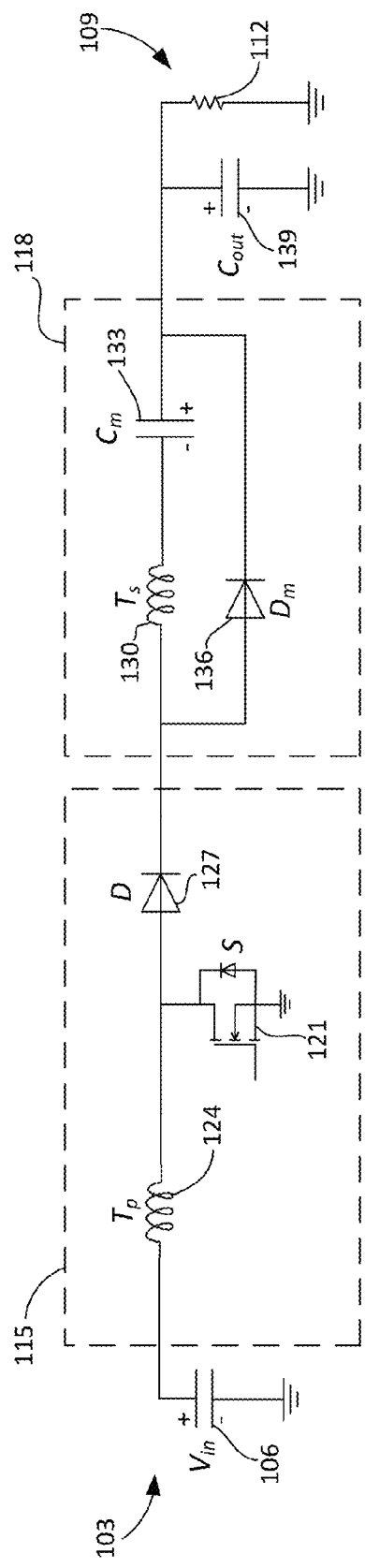
FIG. 2 is an exemplary circuit diagram of the converter of FIG. 1.

FIG. 2 is an exemplary circuit diagram illustrating additional features of the converter 100. In FIG. 2, an output capacitor 139 electrically connected to VM cell 118 provides an electrical output to the output terminal 109. The output capacitor 139 is charged to the output voltage by the multiplier capacitor 133 when the multiplier capacitor 133 is discharged. In this embodiment, the high gain DC/DC converter 100 implements a switching sequence that includes a storing sequence in which switch 121 conducts thus energizing primary winding 124. The switching sequence further comprises a releasing sequence in which switch 121 does not conduct thus discharging primary winding 124. In another embodiment, output capacitor 139 charges during the releasing sequence, and the charge is based on the current conducted by boost cell 115, and the charge is provided by the multiplier capacitor 133 of VM cell 118.

Figure 3:
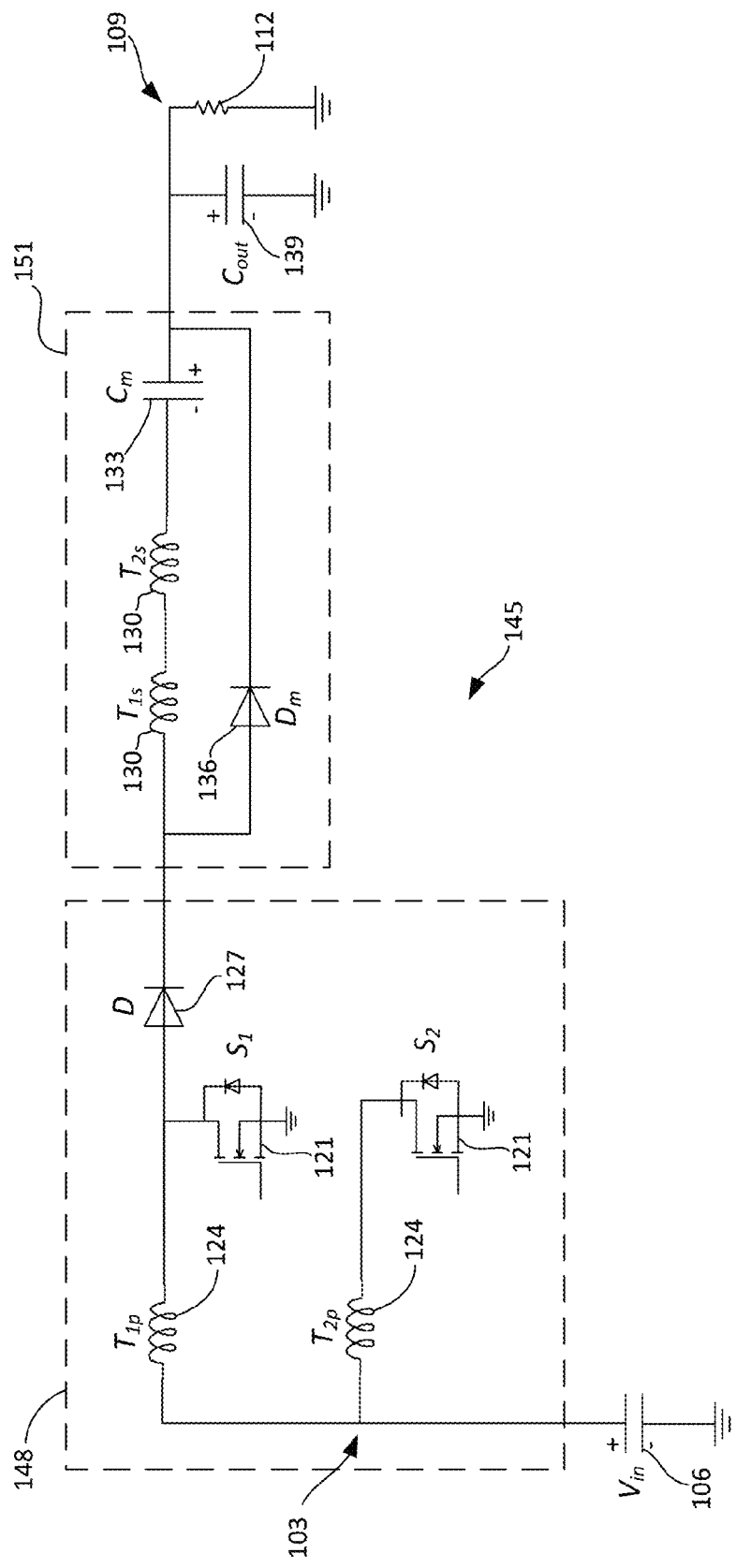
FIG. 3 is an exemplary circuit diagram of a general topology for the inventive high-gain DC/DC converter according to an embodiment of the present invention.

FIG. 3 is an exemplary circuit diagram according to another embodiment of the invention. In this embodiment, a high-gain DC/DC converter 145 includes a boost cell 148 cascaded with a VM cell 151. The boost cell 148 comprises first and second boost segments, including switches 121a and 121b and primary windings 124a and 124b as previously described. In addition, boost cell 148 as shown in FIG. 3 further comprises boost diode 127. As shown in FIG. 3, VM cell 151 comprises first and second VM segments, each of which comprises a distinct secondary winding 130 (e.g., secondary windings 130a and 130b). The VM cell 151 also includes multiplier diode 136 and multiplier capacitor 133. And the converter 145 further comprises output capacitor 139.

With further reference to FIG. 3, as will be further described, when switch 121a is turned ON, primary winding 124a (e.g., the magnetizing inductor of a transformer) of the boost cell 148 is energized. At the same time, the secondary windings 130a and 130b (e.g., the secondary side of the transformer or coupled inductors) of VM cell 151 charge multiplier capacitor 133 through multiplier diode 136 with a spiky current. In an embodiment, multiplier capacitor 133 is charged through multiplier diode 136 via secondary windings 130a and 130b with a spiky current to a voltage value comprising $N*V_{in}$, representing the turns ratio between the primary and secondary windings of the transformer (N) multiplied by the voltage input ($V_{in}$) at the source 106. When switch 121a is turned OFF, boost diode 127 conducts, and a boost-type mechanism charges output capacitor 139 and discharges multiplier capacitor 133.

In an embodiment, $S_1$ (switch 121a of the first boost segment) is left ON while $S_2$ (switch 121b of the second boost segment) is turned OFF, as will be further described herein. The voltage gain of the topology is $(1+N)/(1-D)$, with (N) defined as above, and (D) defined as the duty cycle. The voltage gain of the topology is much better than a conventional boost converter. The converter 145 of FIG. 3 improves upon the converter 100 of FIG. 2 by adding a second phase, namely, the second boost segment. The second boost segment contributes to the input current measured at input terminal 103 as well as the input current measured at VM cell 151. In an embodiment, $S_1$ and $S_2$ are turned ON 180° out of phase from each other with duty cycles that are larger than 0.5.

Figure 4:
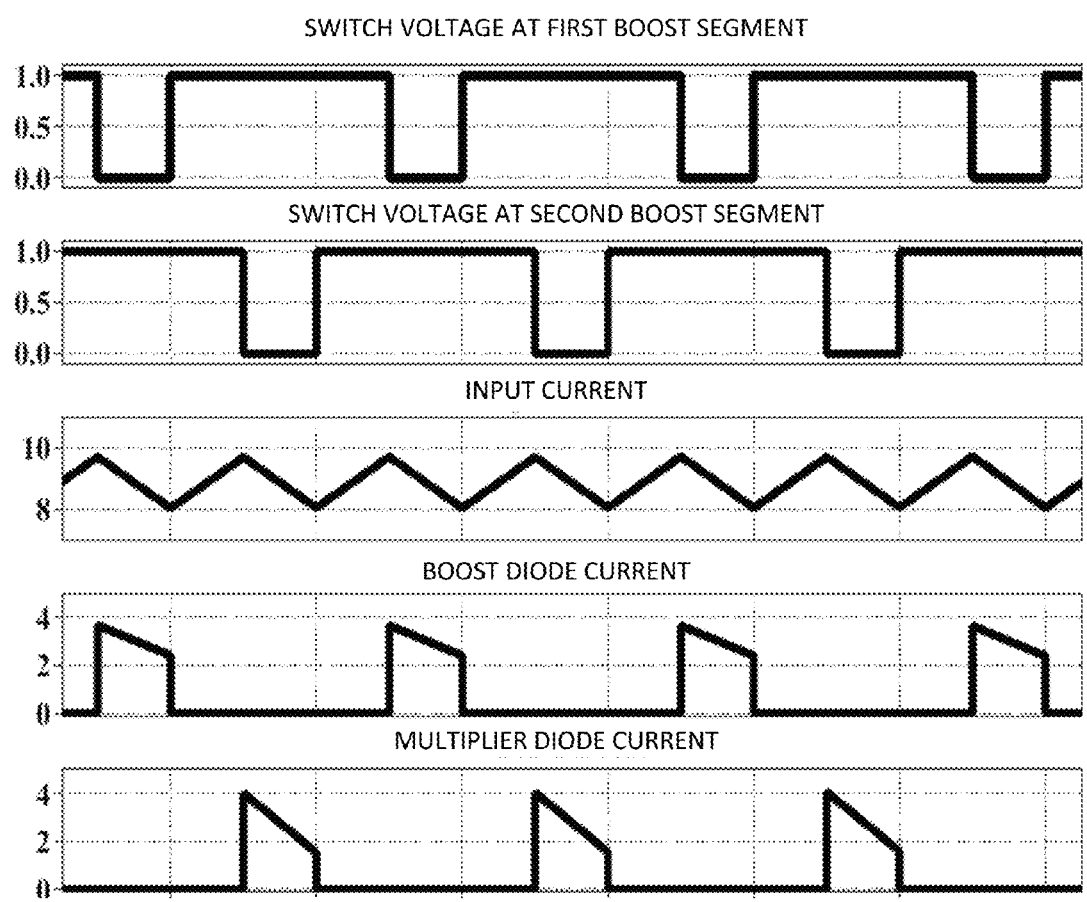
FIG. 4 depicts the waveforms for the topology of FIG. 3.

FIG. 4 depicts exemplary voltage and current waveforms for the circuit topology of FIG. 3, according to an embodiment of the present invention. When both switches $S_1$ and $S_2$, such as switches 121a and 121b of the first and second boost segments, respectively, are in an ON position, the magnetizing inductance of transformers comprising $T_{1p}$ (primary winding 124a of the first boost segment) and $T_{2p}$ (primary winding 124b of the second boost segment) get energized. At the same time, boost diode 127 and multiplier diode 136 are OFF. When $S_1$ is turned OFF, boost diode 127 conducts, multiplier capacitor 133 is discharged, and output capacitor 139 is charged. When $S_2$ is turned OFF, multiplier diode 136 conducts and charges multiplier capacitor 133. In an embodiment, the input terminal 103 current is continuous with a small ripple that is twice the switching frequency. The voltage transfer ratio is $(1+2N)/(1-D)$, which is quite high. One can select N=2 and D=0.75 to achieve a voltage gain of 20. Another advantage of this topology is that the switches 121a and 121b only see a reduced voltage of $(1+2N)$ when they are OFF. In addition, since there are two phases in parallel on the input terminal 103 side, the current stress of the switches 121a and 121b is reduced.

Aspects of the invention also address certain potential leakage inductance issues. Although not shown in FIG. 4, the leakage inductances of each transformer comprising the primary winding 124 and the secondary winding 130 should not be neglected. For example, when $S_2$ is turned OFF, the energy stored in the leakage inductance of $T_{2p}$ needs to find a conduction path to release itself. One simple solution comprises, in an embodiment, adding a boost diode 127 in the second boost segment, and an active snubber between boost cell 148 and before voltage multiplier cell 151 connecting boost diode 127 of the first boost segment and the corresponding boost diode 127 of the second boost segment together, resulting in a connection to voltage multiplier cell 151. The added boost diode 127 in the second boost segment conducts during switching transitions when $S_1$ turns ON and also when $S_2$ turns OFF. In both cases, added boost diode 127 clamps the drain of $S_2$ to the output voltage. If a lower clamping voltage is required, then in an embodiment, another capacitor at the connection between the boost diodes 127 and the voltage multiplier cell 151 is added, reducing the clamping voltage to $V/(1+2N)$.

Figure 5A:
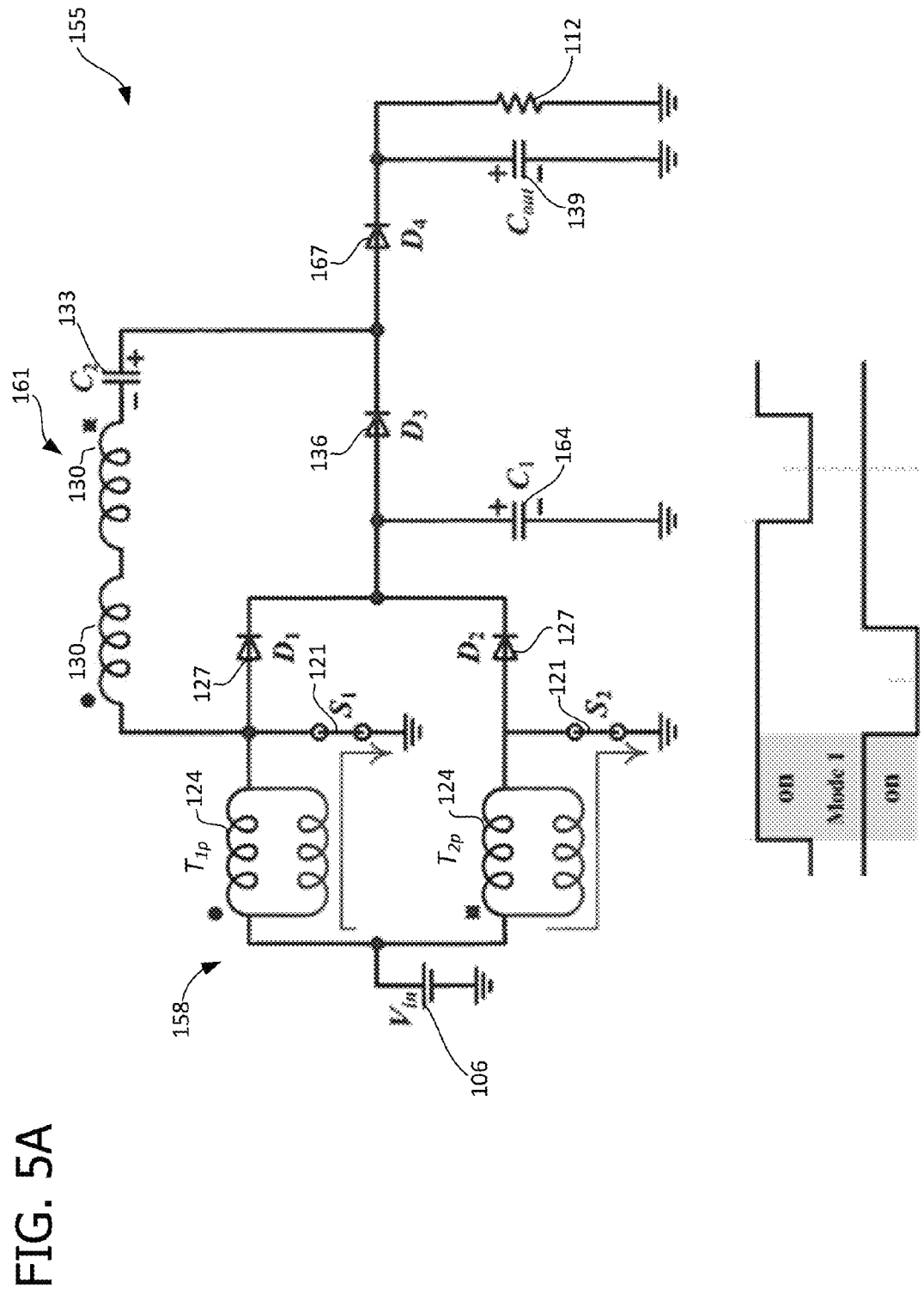
FIGS. 5A-5C are exemplary circuit diagrams describing the modes of operation of a converter topology according to an embodiment of the present invention.
Figure 5B:
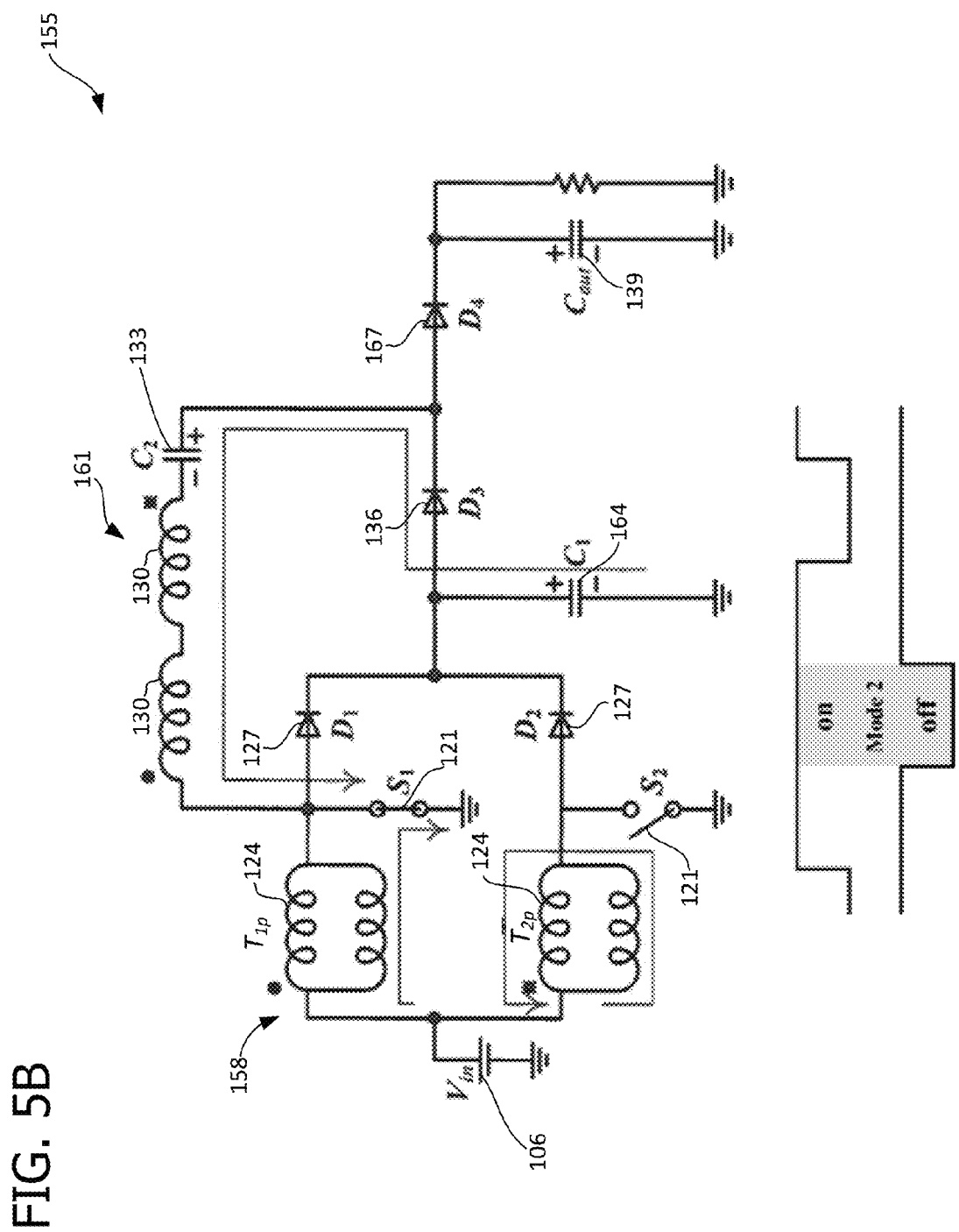
Figure 5C:
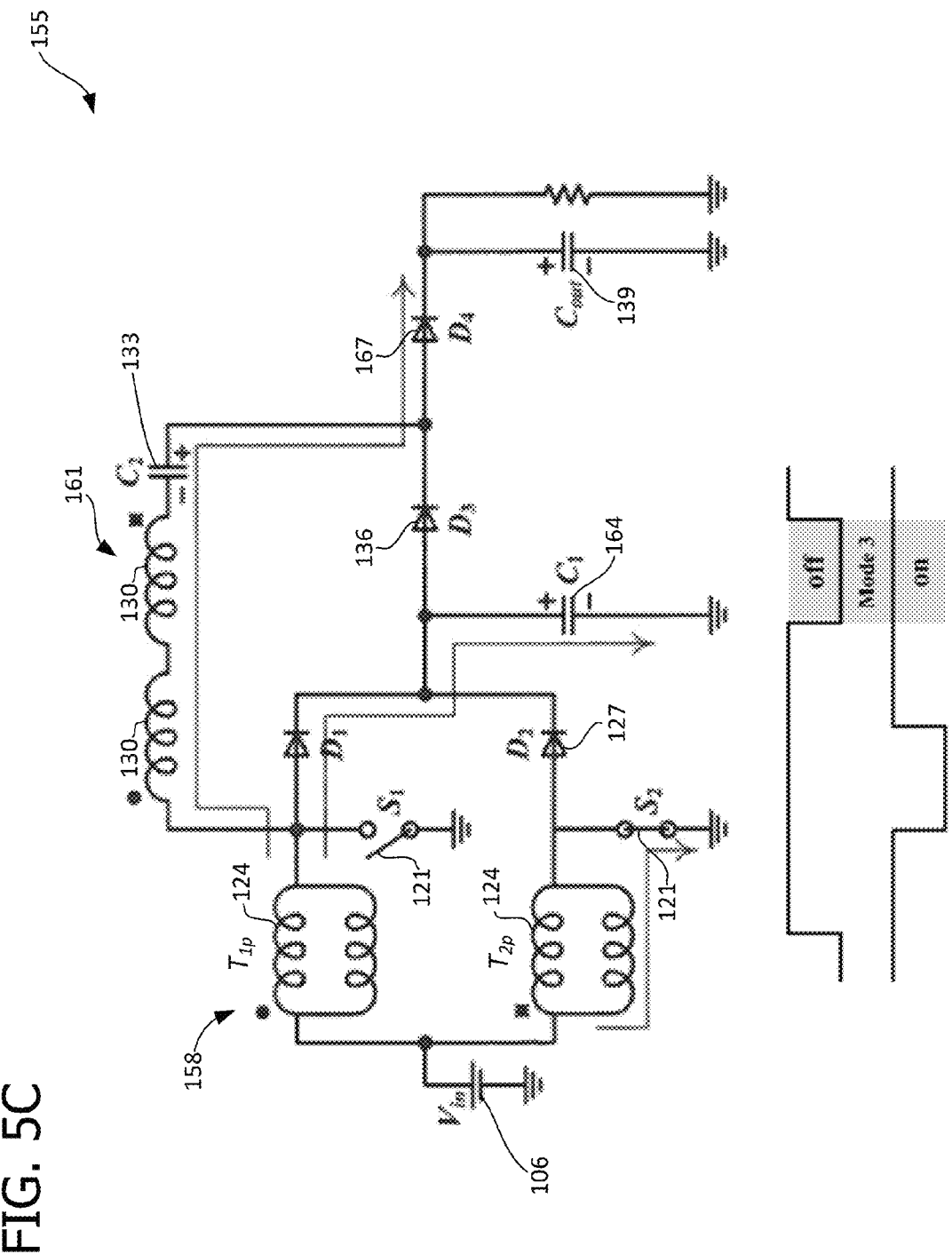

FIGS. 5A-5C are circuit diagrams describing the modes of operation of a converter topology embodying aspects of the present invention. In the illustrated embodiment, a high gain DC/DC converter 155 comprises a boost cell 158 having a first boost segment that performs a first sequence according to a first control signal. The boost cell 158 also has a second boost segment electrically connected in parallel with the first boost segment that performs a second sequence according to a second control signal. The first sequence includes a first storing sequence and a first releasing sequence and the second sequence includes a second storing sequence and a second releasing sequence. In another embodiment, the first sequence is distinct from the second sequence. In yet another embodiment, the first storing sequence includes the second releasing sequence, and the second storing sequence includes the first releasing sequence. In addition, the converter 145 of FIGS. 5A-5C includes a VM cell 161 having first and second VM segments, each of which comprises a distinct secondary winding 130. The VM cell 161 also includes multiplier diode 136 and multiplier capacitor 133.

The high gain DC/DC power converter 155 depicted in FIGS. 5A-5C has three modes of operation: 1) $S_1$ (switch 121 of the first boost segment) is ON and $S_2$ (switch 121 of the second boost segment) is ON; 2) $S_1$ (switch 121 of the first boost segment) is ON and $S_2$ (switch 121 of the second boost segment) is OFF; and 3) $S_1$ (switch 121 of the first boost segment) is OFF and $S_2$ (switch 121 of the second boost segment) is ON.

FIG. 5A depicts the first mode of operation as described above according to an embodiment of the invention. As described above, the first mode of operation occurs when switches $S_1$ and $S_2$ are in an ON position. During the first mode of operation, the magnetizing inductances of the transformers comprising secondary windings 130a and 130b are energized by source 106. At the same time, boost diodes 127a and 127b are OFF, and multiplier capacitor 133, output capacitor 139, as well as a boost cell output capacitor 164, are not charged or discharged.

FIG. 5B depicts the second mode of operation according to an embodiment of the present invention. When $S_1$ (switch 121a of the first boost segment) is turned ON, multiplier diode 136 is conducting. In this mode, the energy stored in the magnetizing inductance of the second boost segment flows through the primary side winding 124b of the second boost segment, i.e., $T_{2p}$. The multiplier diode 136 is conducting; therefore, the boost cell output capacitor 164 is discharging and multiplier capacitor 133 is charging.

FIG. 5C depicts the third mode of operation according to an embodiment of the present invention. During the third mode of operation, $S_1$ (switch 121a of the first boost segment) is OFF and $S_2$ (switch 121b of the second boost segment) is ON. Also, during the third mode of operation boost diode 127*a* of the first boost segment is ON as well as an output diode 167. Therefore, part of the energy stored in the magnetizing inductance of the first boost segment charges boost cell output capacitor 164. The rest of the energy stored in the magnetizing inductance of the first boost segment charges output capacitor 139. Additionally, the boost diode 127*b* of the second boost segment of boost cell 158 conducts during the short discharge period of the leakage inductance of inductors comprising the boost and VM segments.

In an embodiment, the first boost and VM segments are embodied by a first transformer and the second boost and VM segments are embodied by a second transformer. Because the boost diode 127*b* of the second boost segment conducts during the short discharge period of the leakage inductance of the first transformer and the second transformer, this boost diode 127*b* clamps the voltage of the corresponding switch $S_2$ to boost cell output capacitor 164.

The transfer functions at each of the boost cell output capacitor 164 (depicted as $C_1$ below), multiplier capacitor 133 ($C_2$), and output capacitor 139 ($C_{out}$) as a function of the voltage at the power source 106 ($V_{in}$) are as follows:

$$V_{C_1} = \frac{V_{in}}{1-d}; V_{C_2} = \frac{N+1}{1-d}V_{in}; V_{C_{out}} = \frac{2N+2}{1-d}V_{in}$$

Where d the duty cycle and N is the turns ratio, as described above.

Figure 6A:
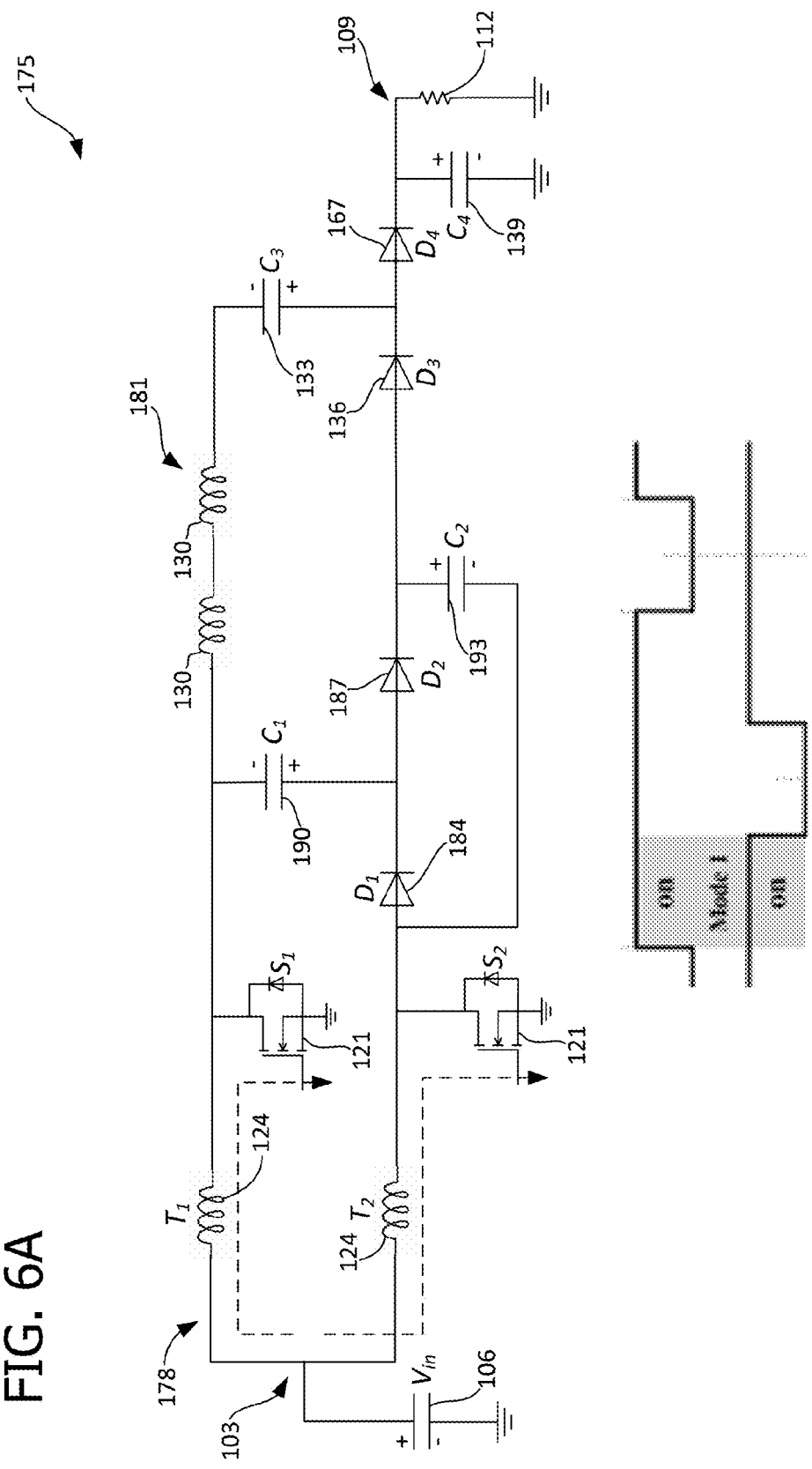
FIGS. 6A-6C are exemplary circuit diagrams describing the modes of operation of a converter topology according to another embodiment of the present invention.
Figure 6B:
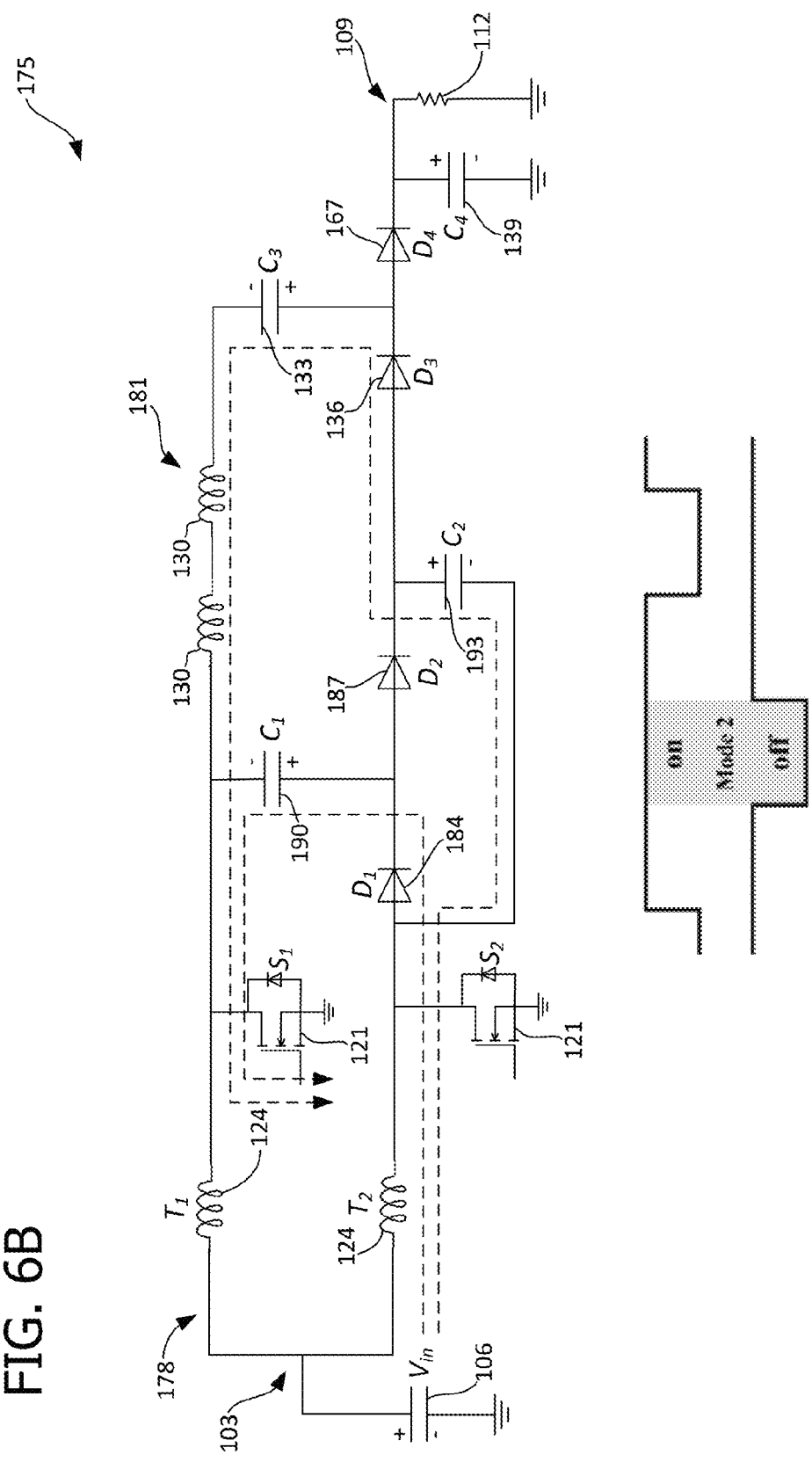
Figure 6C:
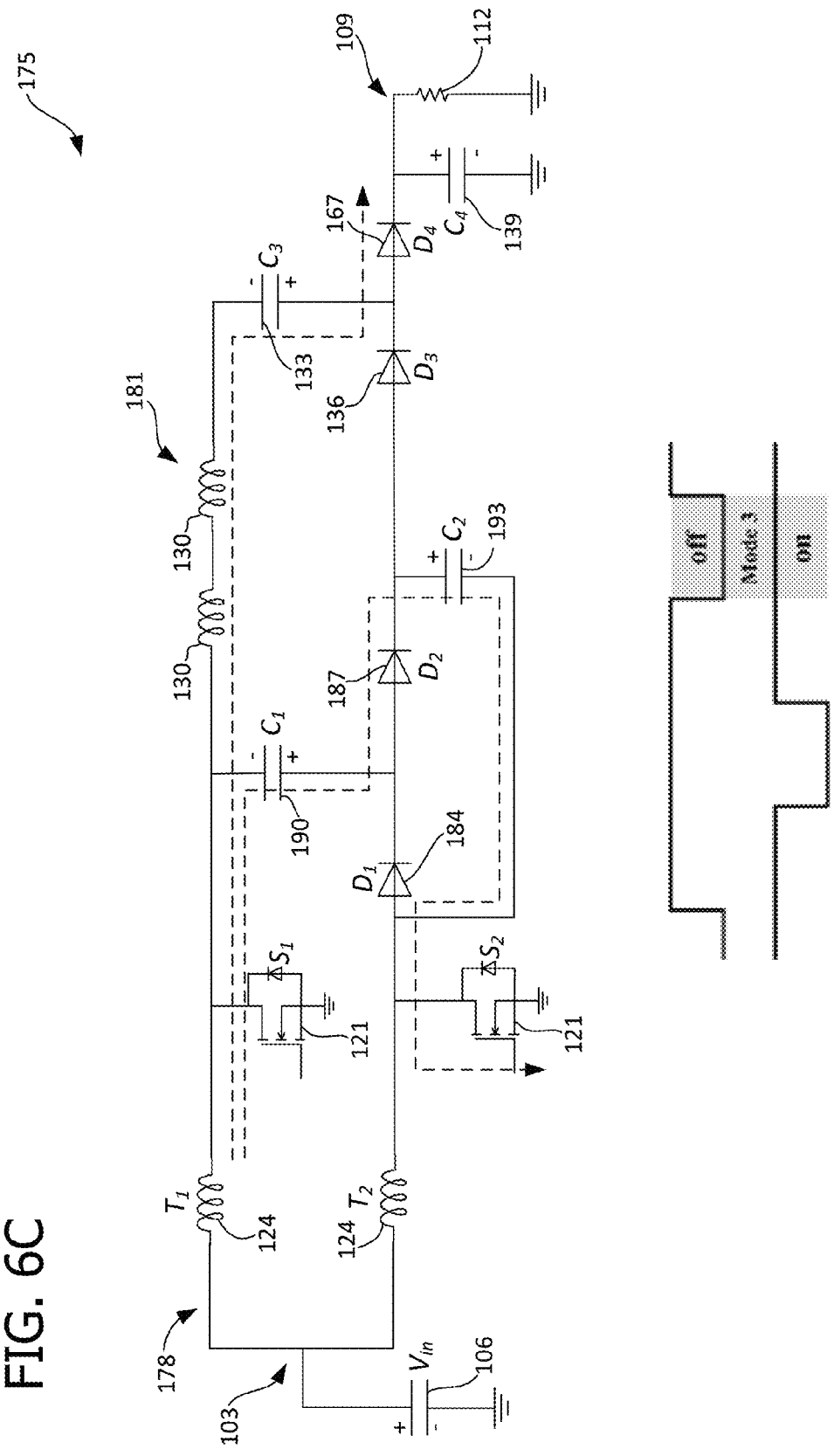

FIGS. 6A-6C are circuit diagrams describing the modes of operation of another exemplary topology embodying aspects of the present invention. In the illustrated embodiment, a high gain DC/DC converter 175 comprises a boost cell 178 having a first boost segment that performs a first sequence according to a first control signal and a second boost segment electrically connected in parallel with the first boost segment and performing a second sequence according to a second control signal. In this instance, the first sequence includes a first storing sequence and a first releasing sequence and the second sequence includes a second storing sequence and a second releasing sequence. In another embodiment, the first sequence is distinct from the second sequence. In yet another embodiment, the first storing sequence includes the second releasing sequence, and the second storing sequence includes the first releasing sequence. In addition, the converter 175 of FIGS. 6A-6C includes a VM cell 181 having first and second VM segments, each of which comprises a distinct secondary winding 130*a* and 130*b*. The VM cell 181 also includes multiplier diode 136 and multiplier capacitor 133. The converter 175 of FIGS. 6A-6C further comprises additional diodes 184 and 187 and additional capacitors 190 and 193.

The high gain DC/DC power converter 175 depicted in FIGS. 6A-6C has three modes of operation: 1) $S_1$ (switch 121*a* of the first boost segment) is ON and $S_2$ (switch 121*b* of the second boost segment) is ON; 2) $S_1$ (switch 121*a* of the first boost segment) is ON and $S_2$ (switch 121*b* of the second boost segment) is OFF; and 3) $S_1$ (switch 121*a* of the first boost segment) is OFF and $S_2$ (switch 121*b* of the second boost segment) is ON.

FIG. 6A depicts the first mode of operation described above according to an embodiment of the present invention. The first mode of operation occurs when switches switches $S_1$ and $S_2$ are in an ON position. During the first mode of operation, the magnetizing inductances of the transformers comprising secondary windings 130*a* and 130*b* of VM cell 181 are energized by source 106. At the same time, the additional diodes 184, 187, multiplier diode 136, and output diode 167 are OFF. Furthermore, each of the capacitors of the second topology, namely, additional capacitors 190, 193, multiplier capacitor 133, and output capacitor 139, are not charged or discharged.

FIG. 6B depicts the second mode of operation according to an embodiment of the present invention. In this second mode, part of the energy stored in the magnetizing inductance of the second boost segment flows through diode 184, capacitor 190, and $S_1$ (switch 121*a* of the first boost segment). Therefore, capacitor 190 is charged. At the same time, the other part of the energy stored in the magnetizing inductance of the second boost segment flows through capacitor 193, multiplier diode 136, multiplier capacitor 133, and $S_1$. Therefore, capacitor 193 is discharged and multiplier capacitor 133 is charged.

FIG. 6C depicts the third mode of operation according to an embodiment of the present invention. During the third mode of operation, $S_1$ (switch 121*a* of the first boost segment) is OFF and $S_2$ (switch 121*b* of the second boost segment) is ON. Also, during the third mode of operation additional diode 187 is ON and output diode 167 is ON. Therefore, part of the energy stored in the magnetizing inductance of the first boost segment discharges capacitor 190 and charges capacitor 193. The rest of the energy stored in the magnetizing inductance of the first boost segment discharges multiplier capacitor 133 and charges output capacitor 139. The transfer functions at each of capacitor 190 (depicted as $C_1$ below), capacitor 193 ($C_2$), multiplier capacitor 133 ($C_3$), and output capacitor 139 ($C_4$) as a function of the voltage at the power source 106 ($V_{in}$) are as follows:

$$\frac{V_{C_1}}{V_{in}} = \frac{1}{1-d}; \frac{V_{C_2}}{V_{in}} = \frac{2}{1-d}; \frac{V_{C_3}}{V_{in}} = \frac{N+3}{1-d}; \frac{V_{C_4}}{V_{in}} = \frac{2N+4}{1-d}$$

Where d and N are defined as described above.

Figure 7:
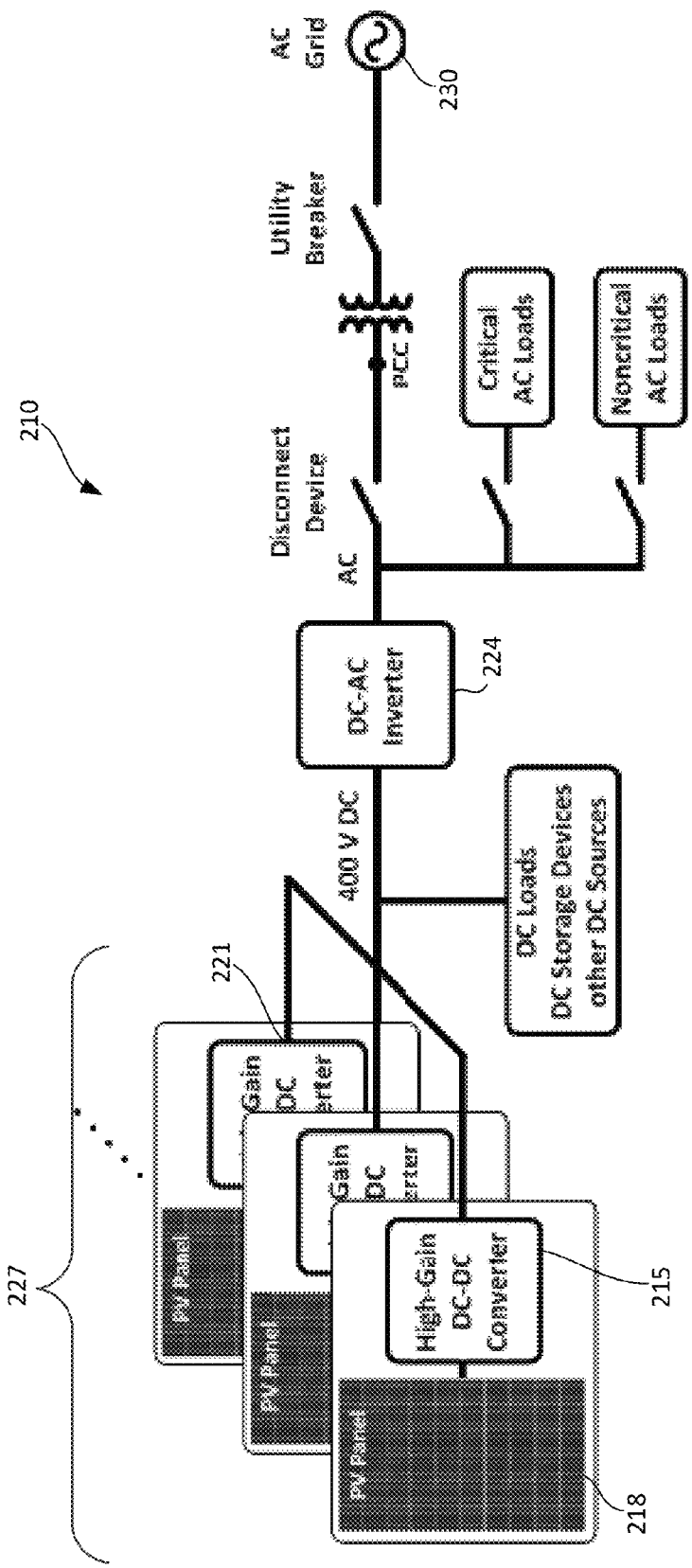
FIG. 7 is a schematic diagram of a photovoltaic (PV) system with the inventive high-gain DC/DC converters according to an embodiment of the present invention.

FIG. 7 is a schematic diagram of a photovoltaic (PV) system 210 embodying aspects of the invention. As illustrated, the PV system 210 includes one or more high-gain DC/DC converters 215 according to an embodiment of the present invention. FIG. 7 depicts a DC parallel architecture that improves overall system performance by isolating individual PV panels 218. In system 210, each individual PV panel 218 is equipped with a corresponding high-gain DC/DC power electronic converter 215 that boosts the lower DC voltage of the panel 218 to a higher voltage (e.g., 400 V DC). At the same time, each converter 215 is configured to perform maximum power point tracking (MPPT) during power conversion. Each output 221 of each DC/DC converter 215 is placed in parallel and then fed to a central DC/AC inverter 224. In an embodiment, each DC/DC converter 215 is mounted directly under each panel 218. In another embodiment, each converter 215 is mounted wherever is most convenient.

In an embodiment, the system 210 illustrated in FIG. 7 is configured to provide DC power to a DC distribution network 402 that is also connected to an AC grid network 405 through the use of a power converter network comprising a number of network connected converters 215. The system 210 comprises a DC generation system 227 providing generated power, the DC generation system comprising a plurality of generation modules or the like, such as PV panels 218. The DC generation system provides the generated power via output terminals 221.

The system 210 further comprises a power converter network, which has a number of network connected converters 215 that receive the power from the DC generation system 227, and each converter 215 is connected to a generation module output terminal. The system 210 also comprises a DC distribution network that receives the power from the power converter network for distribution to an AC grid network 230, the DC distribution network being connected in parallel with each power converter 215 comprising the power converter network. Furthermore, the power converter network of the system 210 is configured to provide uninterrupted DC power to the DC distribution network independent of the status of the AC grid network 230.

In an embodiment, system 210 further comprises DC distribution network components, such as storage, conversion, and high power load components, and the like. In another embodiment, the DC distribution network further comprises a high voltage DC bus connecting the DC distribution network to the components and to the AC grid network 230 via a common connection. In yet another embodiment, the DC storage component further comprises a battery module; the DC conversion component is configured to provide low power DC to low power DC load components; and the high power DC load component comprises an air conditioning unit.

Figure 8:
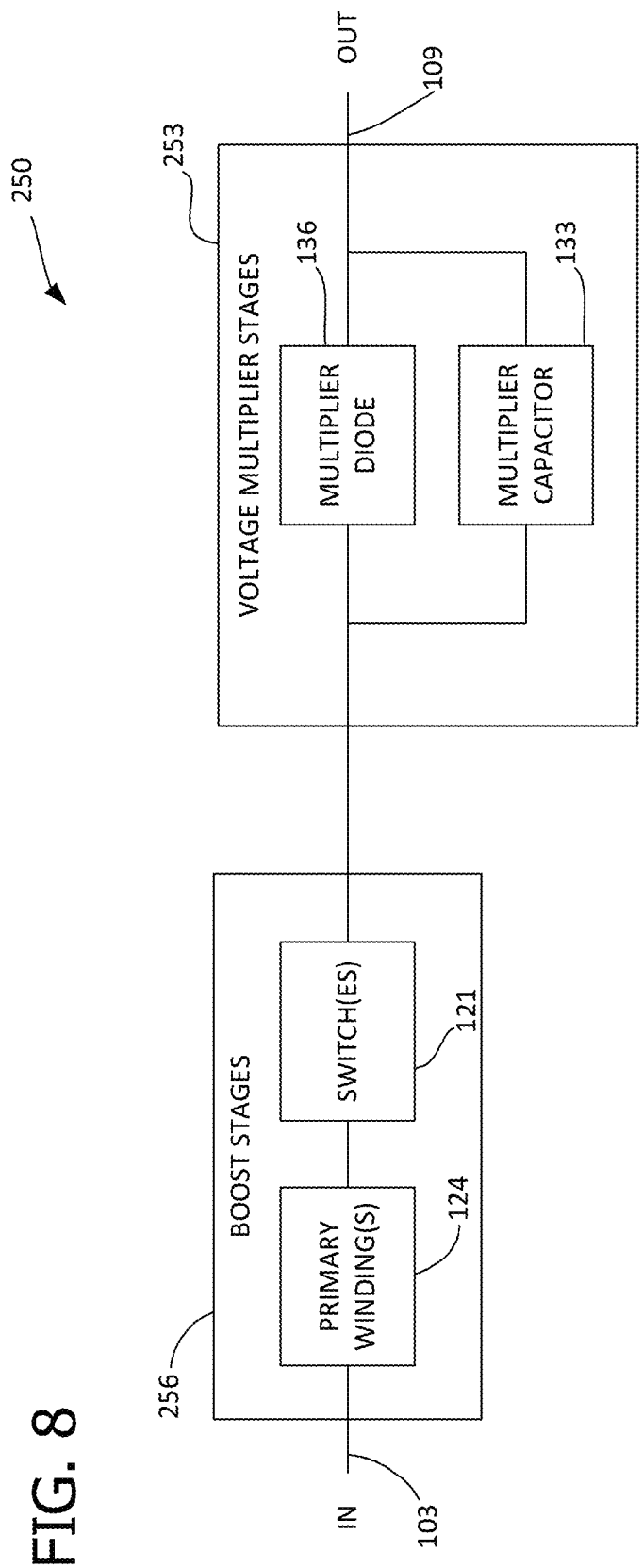
FIG. 8 is a block diagram of a converter topology with a boost topology integrated with a voltage multiplier (VM) topology according to another embodiment of the present invention.
Figure 9A:
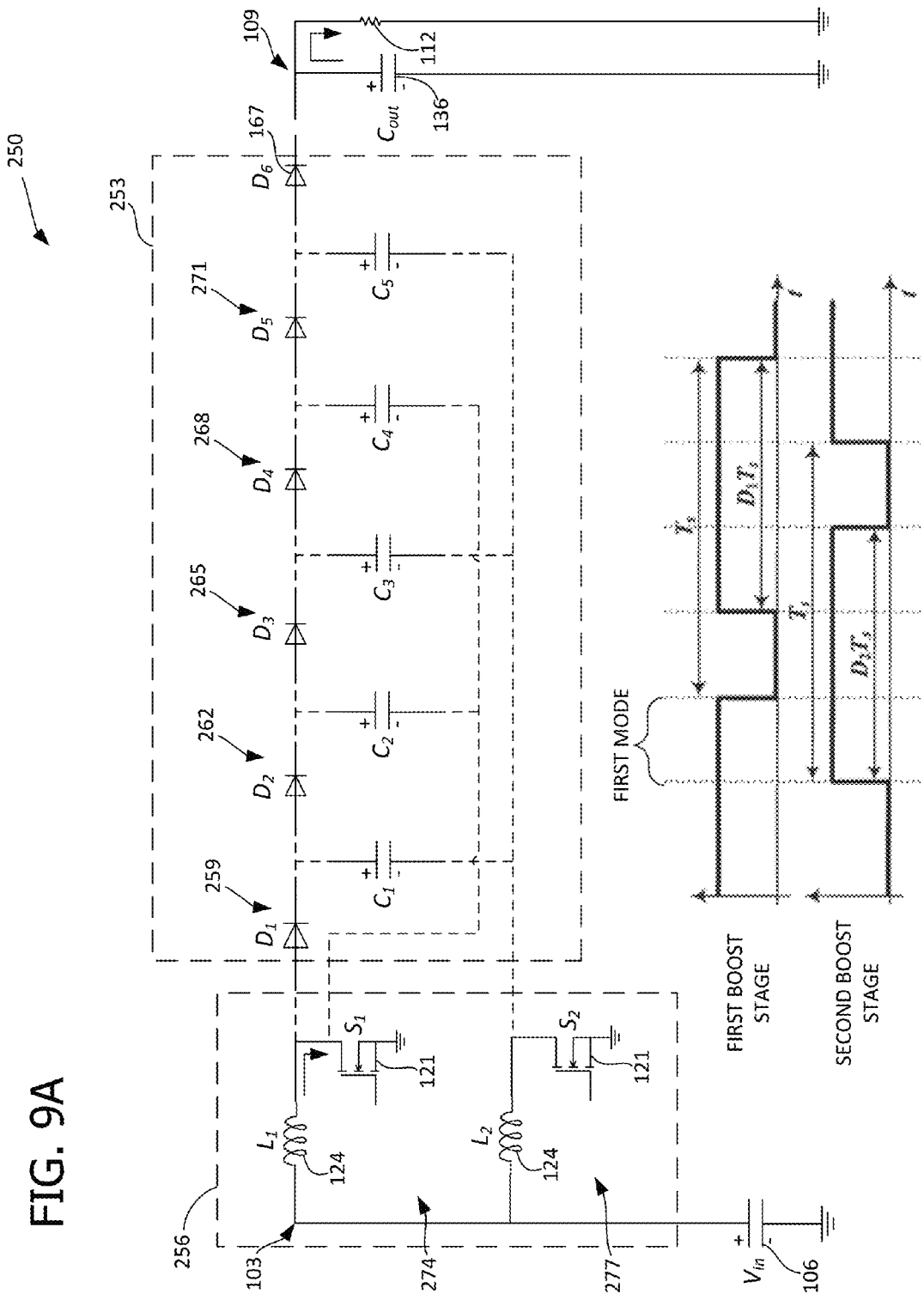
FIGS. 9A-9C are exemplary circuit diagrams of the converter of FIG. 8 depicting three modes of operation for a non-isolated DC/DC power converter with a boost topology integrated with a voltage multiplier (VM) topology according to one embodiment of the present invention.
Figure 9B:
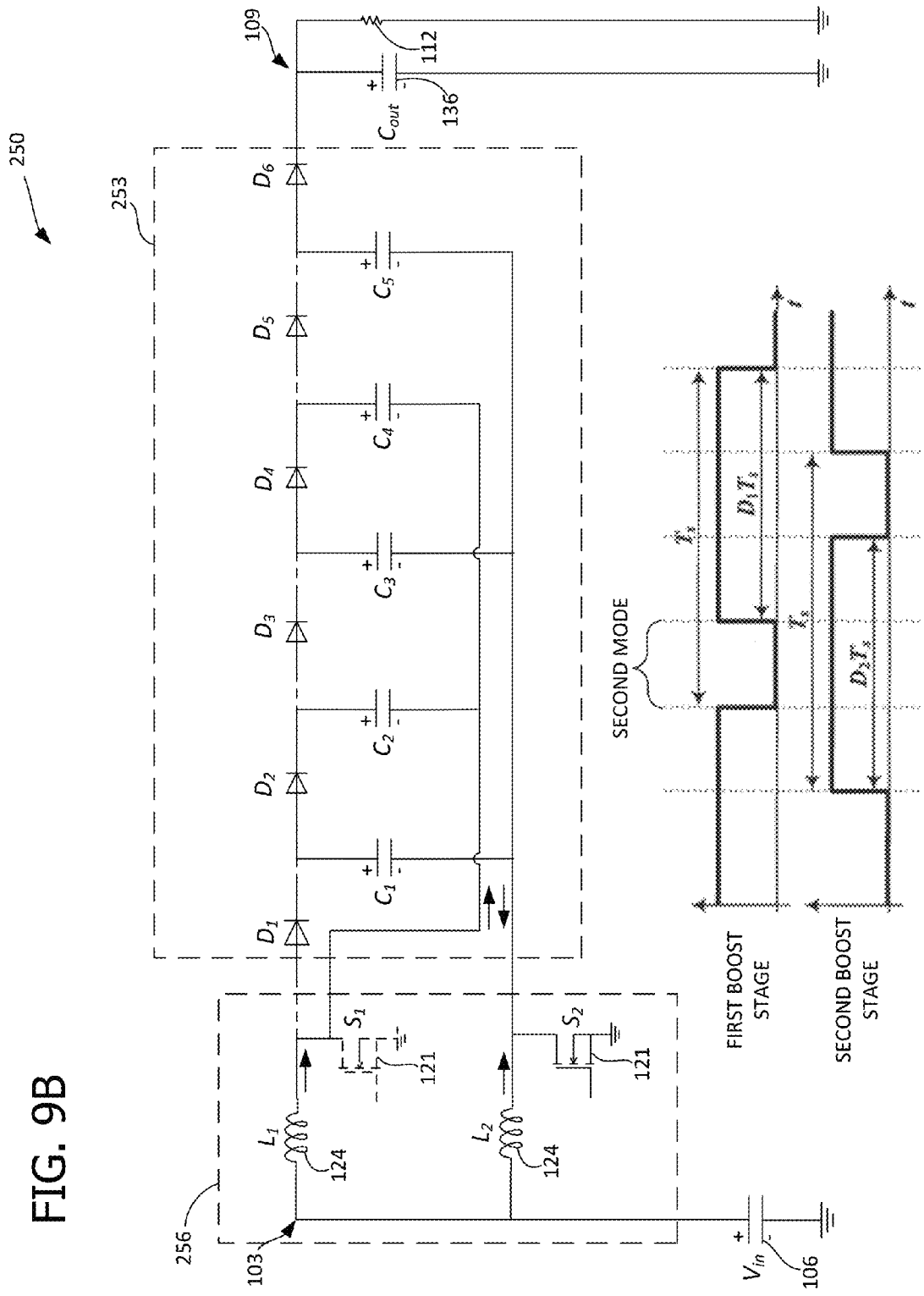
Figure 9C:
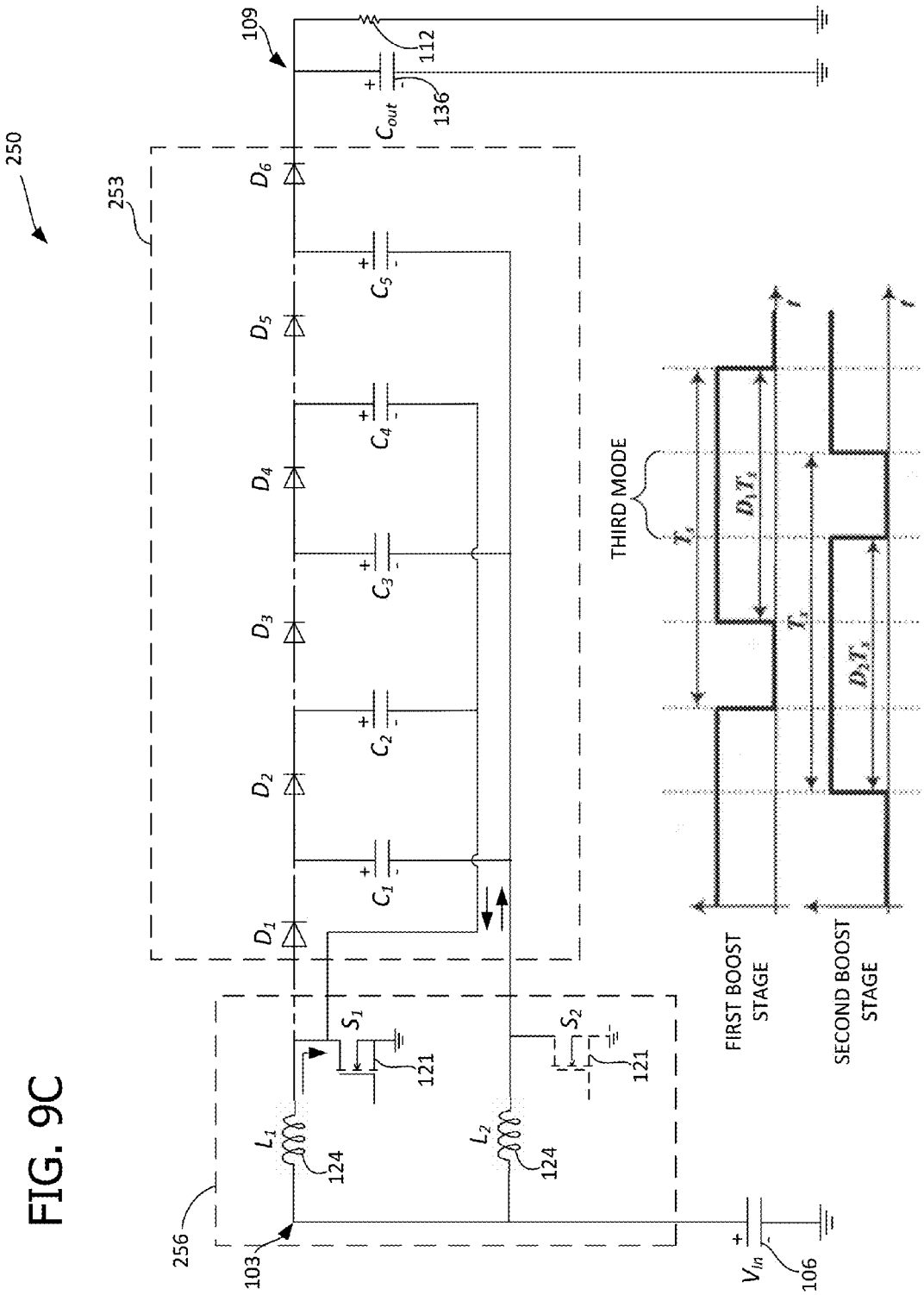

Aspects of the present invention further relate to the field of electronic converters and, more specifically, to a non-isolated high voltage-gain DC/DC power electronic converter 250 shown in FIG. 8 capable of drawing continuous current from a single or multiple input sources in an interleaved manner. The converter 250 comprises one or more diode-capacitor voltage multiplier (VM) stages 253 integrated with multiple boost stages 256 at the input, and uses the VM stages 253 to help the boost stage 256 achieve a higher overall voltage gain. The voltage conversion ratio depends on the number of VM stages 253 and the switch duty ratios of the input boost stages 256. The versatility of the VM stages 253 makes their use appealing for integration with boost stages 256, particularly in renewable applications such as solar farms utilizing PV panels. As described in greater detail below, FIGS. 9A-9C are circuit diagrams describing three modes of operation of another exemplary topology embodying aspects of the present invention. As shown, the non-isolated DC/DC power converter 250 includes a boost topology integrated with a VM topology to provide high voltage gains. In the illustrated embodiment, an integrated VM stage 253 comprises a plurality of VM segments 259, 262, 265, 268, and 271.

The power converter 250 further comprises a boost stage 256 having a first boost segment 274 that performs a first sequence according to a first control signal. For instance, the first sequence includes a first storing sequence and a first releasing sequence. A second boost segment 277 of the boost stage 256 in the illustrated embodiment is electrically connected with the first boost segment 274 and performs a second sequence according to a second control signal. According to aspects of the invention, the second sequence is distinct from the first sequence and comprises a second storing sequence and a second releasing sequence. In an embodiment, each of the boost segments 274, 277 of the boost stage 256 comprises a storage component and a switching component, such as winding 124 and switch 121, respectively. For example, winding 124 comprises an inductor and switch 121 comprises a MOSFET. In another embodiment, the inductors are selected such that ripple current is between 20% and 40% of output current.

Referring further to FIG. 9A, power converter 250 further comprises the VM stage 253 electrically connected in parallel between the first boost segment 274 and the second boost segment 277. As shown, the segments of VM stage 253 each includes a diode and corresponding capacitor and are connected in series relative to each other. The first VM stage 259 receives energy from the first boost stage 274 during the first storing sequence and the second VM stage 262 receives energy from the second boost stage 277 and from capacitor $C_1$ of the first VM stage 259 during the second releasing sequence. As depicted by the illustrated topology, the power converter 250 further comprises, additionally or alternatively, third VM stage 265, fourth VM stage 268, and fifth VM stage 271.

FIG. 9A depicts a first mode of operation for the power converter 250 according to an embodiment of the present invention. It is to be understood that, although five VM segments, or stages, are illustrated, similar analysis can be expanded for a power converter with N VM stages. In an embodiment, normal operation of the converter 250 comprises some overlapping time when switches 121a and 121b of first and second boost segment 274, 277 are both ON. It is to be understood that during the time period that a switch of a boost stage is ON, such as switch 121a of first boost segment 274, the inductor of the boost stage (i.e., winding 124a, indicated as $L_1$) is charged from the input source 106. Preferably, the source 106 comprises a single power source, such that the power converter 250 operates to provide an interleaved power input to the first VM segment 259 and to the second VM segment 262.

Still referring to FIG. 9A, at least one of switches 121a and 121b of boost stage 256 are ON at any given time, depicted by additional modes of operation as will be further illustrated herein. In an embodiment, normal operation of converter 250 comprises a first storing sequence that includes the second releasing sequence, and further comprises a second storing sequence that includes the first releasing sequence. In another embodiment, a first storing sequence including the second releasing sequence is illustrated by a third mode of operation herein. In yet another embodiment, a second storing sequence including the first releasing sequence is illustrated by a second mode of operation herein.

In the first mode of operation as depicted by FIG. 9A, both switches 121a and 121b of boost stage 256 are ON such that both windings 124a and 124b are charged from input source 106 and the current in each inductor rises linearly. The diodes in VM stage 253 are reverse biased and do not conduct. Consequently, the capacitor voltages in VM stage 253 remain unchanged. The output diode 167 of this embodiment is reverse biased and, thus, the output capacitor 136 supplies the load 112. In an embodiment, the power converter 250 further comprises an output stage including the output capacitor 136 and the output diode 167, wherein the output stage provides power to the load 112 during the first releasing sequence and during the second releasing sequence.

FIG. 9B depicts a second mode of operation for the power converter 250 according to an embodiment of the present invention. During the second mode of operation, switch 121a of first boost segment 274 is OFF and switch 121b of second boost segment 277 is ON. Diodes in each of the first 259, third 265, and fifth 271 VM segments become forward biased, and the current flowing through inductor 124a of first boost segment 274 is forced to flow through the charge pump capacitors, charging the capacitors in the first VM segment 259, third VM segment 265, and fifth VM segment 271 while discharging capacitors in the second VM segment 262 and fourth VM segment 268. The output diode 167 is reverse biased and output capacitor 136 supplies load 112.

FIG. 9C depicts a third mode of operation for the power converter 250 according to an embodiment of the present invention. During the third mode of operation, switch 121a of first boost segment 259 is ON and switch 121b of second boost segment 277 is OFF. Diodes in each of the second VM segment 262 and fourth VM segment 268, as well as output diode 167, become forward biased, and the current flowing through inductor 124b of second boost segment 277 is forced to flow through the charge pump capacitors, charging capacitors in the second 262 and fourth 268 VM segments of VM stage 253, and discharging capacitors in the first 259, third 265, and fifth 271 VM segments. In an embodiment, the third mode of operation comprises the second storing sequence. In another embodiment, the second boost stage 277 charges the second VM stage 262 during the second storing sequence. Output diode 167 is forward biased, charging the output capacitor 136 and supplying the load 112.

In an embodiment, the gain of the interleaved boost converter depicted by the power converter 250 is given by:

$$V_{out} = N_1 \frac{V_{in}}{1-d_1} + (N_2+1)\frac{V_{in}}{1-d_2}$$

where $d_1$ and $d_2$ are duty cycles for upper leg of power converter 250 comprising the first boost stage 274, and the lower leg of the power converter 250 comprising the second boost stage 277, and $N_1$ and $N_2$ are the number of capacitors connected to the switch 121 of the upper and lower legs of the power converter 250. Where $N_1+N_2=N$, and $d_1=d_2=d>0.5$, the interleaved boost stages 274, 277 are operated symmetrically, and the gain of the interleaved boost converter depicted by the power converter 250 of the first configuration is given by $$V_{out} = (N+1)\frac{V_{in}}{1-d}$$

Additionally or alternatively, various components comprising the power converter 250 are determined as set forth below.

In an embodiment, the output capacitor 167 is selected based upon calculating the rms value of currents of the power converter, such as the power converter 250, given by:

$$I_{Cm1,rms} = \sqrt{\frac{N_1+1}{1-d}} I_{out}$$

$$I_{Cm2,rms} = \sqrt{\frac{N_2+1}{1-d}} I_{out}$$

where $I_{Cm1,rms}$ and $I_{Cm2,rms}$ are the current rms values for each of the upper and lower legs of the power converter 250, respectively.

In an embodiment, the value for inductor 124 is selected based upon first setting the current ripple of the inductor to 20% to 40% of the output current, given by:

$$\Delta I_{L1} = (0.2 \text{ to } 0.4) \times \frac{N_1 I_{out}}{(1-d)}$$

$$\Delta I_{L2} = (0.4 \text{ to } 0.4) \times \frac{(N_2+1)I_{out}}{(1-d)}$$

where $I_{L1}$ and $I_{L2}$ are the change in current values for the upper and lower legs of each boost stage, respectively. Furthermore, in an embodiment, the value of the inductor 124 (indicated as $L_1$ and $L_2$ in FIGS. 9A-9C) is selected based on the assumed ripple current, given by:

$$L_1 = \frac{V_{in}d}{\Delta I_{L1}f_{sw}}$$

$$L_2 = \frac{V_{in}d}{\Delta I_{L2}f_{sw}}$$

where $f_{SW}$ is the switching frequency of the power converter.

In an embodiment, the diodes are selected based upon calculating average and rms diode currents, given by $$I_{Dm1,rms} = \sqrt{\frac{N_1}{1-d}} I_{out}$$

$$I_{Dm2,rms} = \sqrt{\frac{N_2}{1-d}} I_{out}$$

where $I_{Dm1,rms}$ denotes the current flowing through the first boost stage 274 of the power converter 250 and $I_{Dm2,rms}$ denotes the current flowing through the second boost stage 277 of the power converter 250, respectively.

Figure 10:
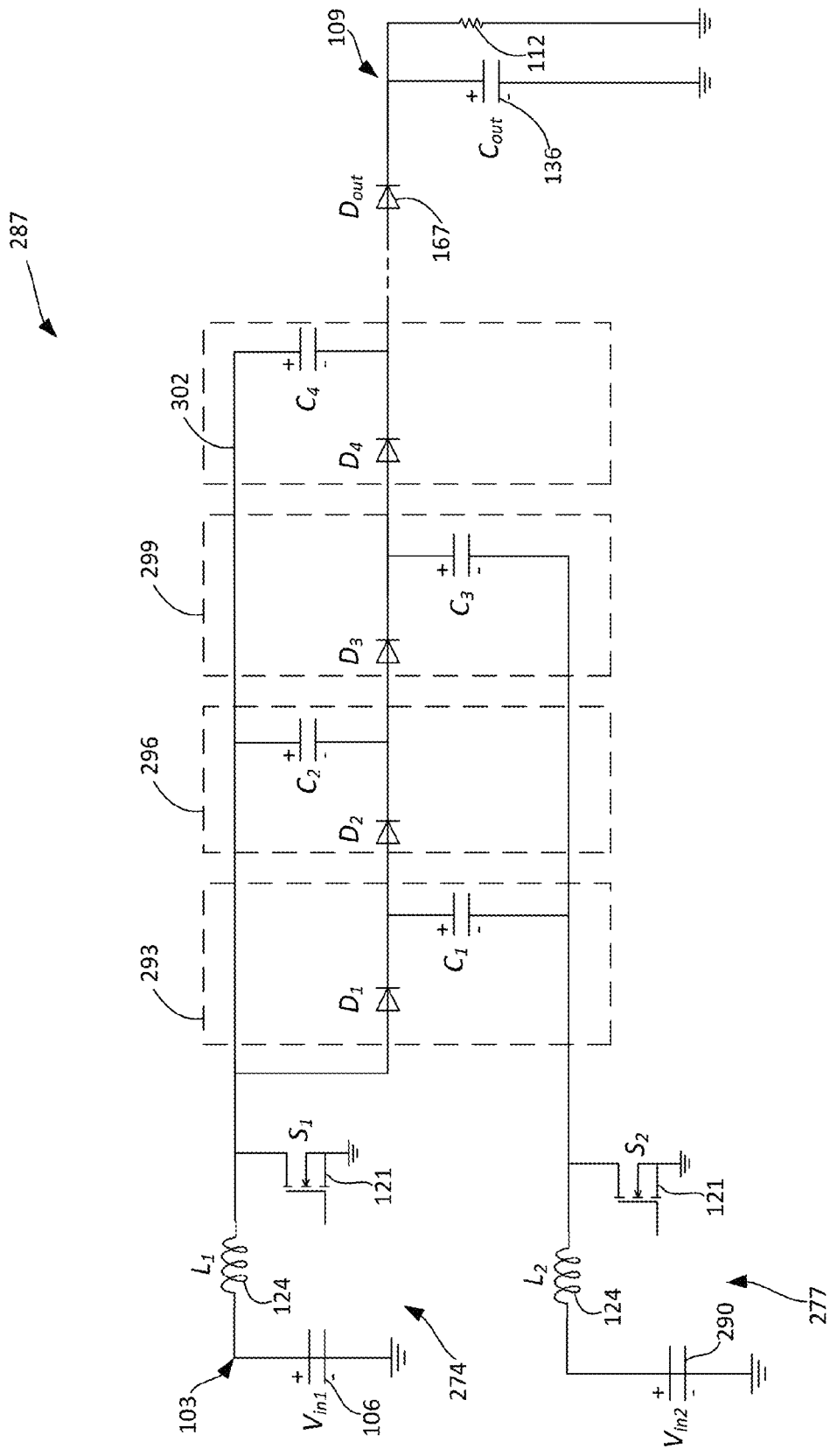
FIG. 10 depicts a non-isolated DC/DC power converter with a boost topology integrated with a VM topology according to another embodiment of the present invention.

FIG. 10 depicts another non-isolated DC/DC power converter 287 embodying aspects of the invention. As shown, power converter includes a boost topology integrated with a VM topology, according to one embodiment of the present invention. In FIG. 10, the power converter 287 provides high voltage gain using integrated VM stages and multiple input sources. In the illustrated embodiment, the multiple input sources comprise input source 106 and second input source 290. In an alternative embodiment, the power converter 287 comprises a single input source. In yet another embodiment, the first boost stage 274 and the second boost stage 277 are connected to a single input source such as input 106, and are configured to provide an interleaved input to one or more VM stages.

Referring further to FIG. 10, converter 287 employs a plurality of VM stages, indicated by at least a first VM segment 293 and a second VM stage 296. In another embodiment, the VM stages further comprise a third VM segment 299 and a fourth VM segment 302. In yet another embodiment, the VM stages comprise N number of VM stages. The power converter 287 is configured to operate according to three modes of operation in a similar manner as described above with reference to FIGS. 9A-9C, and will be further described in greater detail below.

In the event that N number of VM stages are used, the output voltage is given by $$V_{out} = \left(\frac{N+1}{2}\right)\frac{V_{in1}}{(1-d_1)} + \left(\frac{N+1}{2}\right)\frac{V_{in2}}{(1-d_2)}$$

when the number of VM stages (N) is an odd number. Similarly, the output voltage is given by $$V_{out} = \left(\frac{N+2}{2}\right)\frac{V_{in1}}{(1-d_1)} + \left(\frac{N}{2}\right)\frac{V_{in2}}{(1-d_2)}$$

when the number of VM stages (N) is an even number.

As shown in FIG. 10, power converter 287 is capable of operating in an interleaved manner with a single input source, such as input source 106. In an embodiment, the output voltage of the power converter 287 when operating with a single input source, where $d_1$ and $d_2$ are chosen to be identical (i.e., equal to d), has an output voltage given by:

$$V_{out} = (N+1)\frac{V_{in}}{(1-d)}$$

In an embodiment, the topology of the power converter 287 of FIG. 10 is modified as an alternative topology, such that the second boost stage 277 is connected to the input of the diode of the first VM stage 293 and the charge pump capacitor of the first VM stage 293 is connected to the first boost stage 274. Similarly, the first VM stage 274 provides an output to the second VM stage 296, and the charge pump capacitor of the second VM stage 296 is commonly connected to the output of the first boost stage 274. The output voltage equation for the alternative topology is similar to above when the number of VM stages (N) is an odd number, and the output voltage equation for the alternative topology is given by:

$$V_{out} = \left(\frac{N}{2}\right)\frac{V_{in1}}{(1-d_1)} + \left(\frac{N+2}{2}\right)\frac{V_{in2}}{(1-d_2)}$$

when the number of VM stages (N) is an even number.

Figure 11:
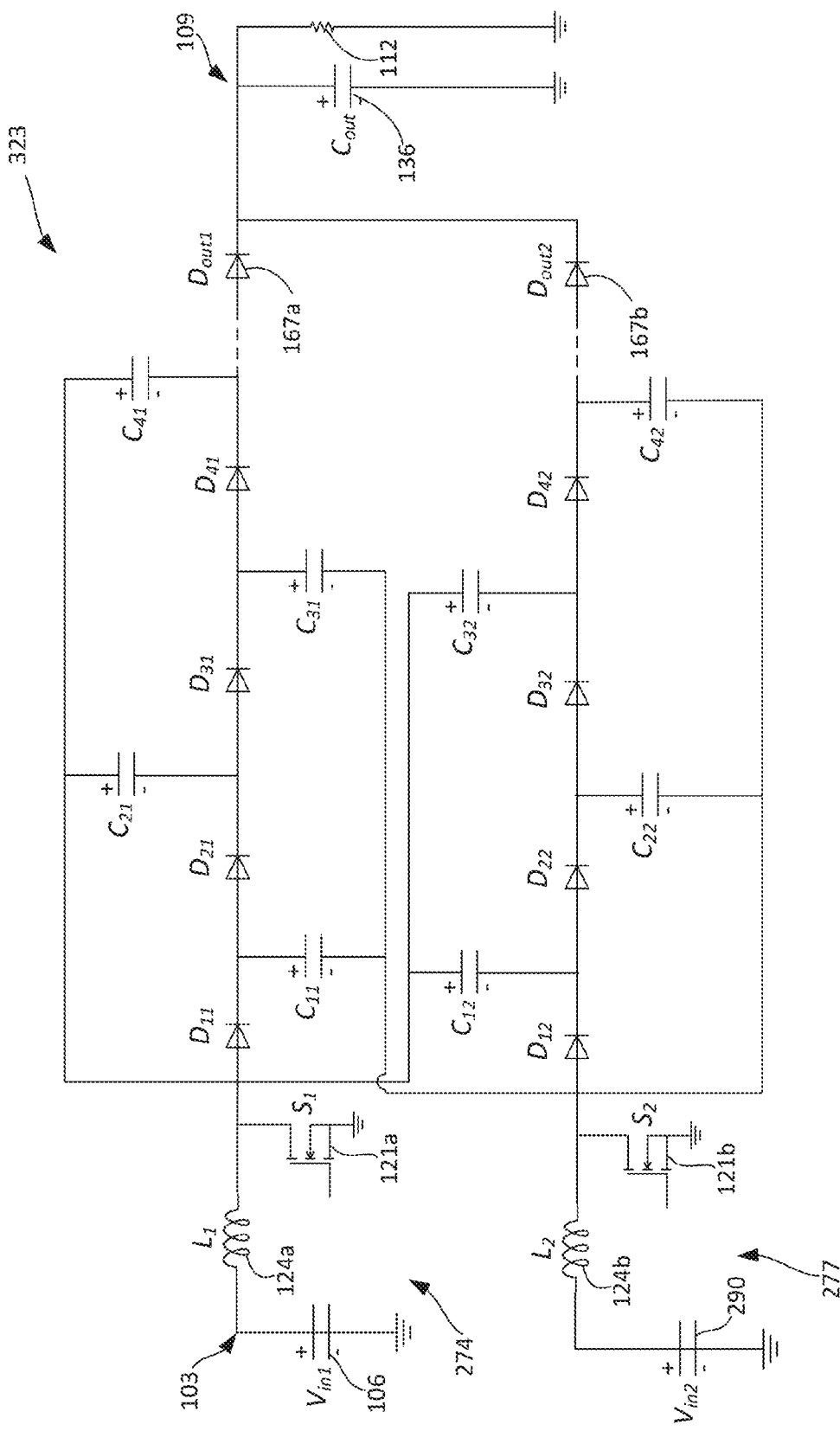
FIG. 11 depicts a non-isolated DC/DC power converter with a boost topology integrated with a VM topology according to yet another embodiment of the present invention.

FIG. 11 depicts a non-isolated DC/DC power converter 323 with a boost topology integrated with a VM topology, according to one embodiment of the present invention. In FIG. 11, the converter 323 features the topology of FIG. 10 combined with an alternative topology. The power converter 323 is configured to operate with three modes of operation, as described above regarding FIGS. 9A-9C and FIG. 10. In an embodiment, the output voltage of power converter 323 is determined in part based upon the number of VM stages (N). When N is odd, the output voltage equation is given by the equation above. For example, the topology of FIG. 10 and the alternative topology each process half of the output power. In other words, the average currents of output diodes 167 (illustrated as $D_{out1}$ and $D_{out2}$) are equal.

Still referring to FIG. 11, in an embodiment, N is equal, and the output voltage is dictated by the topology that provides a higher output voltage. The leg receiving the input from the first boost stage 274 competes with the leg receiving the input from the second boost stage 277, and only one of the output diodes 167 processes the entire power while the other is reverse biased. When N is even, putting the converter 323 in a parallel configuration makes sense if there is only one input source used and $d_1 = d_1$. In the equations above determine the output voltage of the third equation, where N is equal and a single input source 179 is used.

Additionally or alternatively, various components comprising the power converter 287 of FIG. 10 and the power converter 323 of FIG. 11 are determined as follows.

In an embodiment, the value for inductors 124a and 124b is selected such that each of the first boost stage 274 and the second boost stage 277 operates in continuous conduction mode (CCM), requiring minimum inductor values for the inductor 124a of the first boost stage 274 and the inductor 124b of the second boost stage 277 to be:

$$L_{1,crit} = \frac{V_{in1}d_1(1-d_1)}{(N+1)I_{out}f_{sw}}$$

$$L_{2,crit} = \frac{V_{in2}d_2(1-d_2)}{(N+1)I_{out}f_{sw}}$$

when N is an odd number, and requiring the minimum values to be:

$$L_{1,crit} = \frac{V_{in1}d_1(1-d_1)}{(N+2)I_{out}f_{sw}}$$

$$L_{2,crit} = \frac{V_{in2}d_2(1-d_2)}{NI_{out}f_{sw}}$$

when N is an even number.

In another embodiment, the inductor values for the inductor 124a of the first boost stage 274 and the inductor 124b of the second boost stage 277 are selected for the assumed ripple current, and are given by:

$$L_1 = \frac{V_{in1}d_1}{\Delta I_{L1}f_{sw}}$$

$$L_2 = \frac{V_{in2}d_2}{\Delta I_{L2}f_{sw}}$$

In an embodiment, the diodes are selected based upon calculating average diode currents, given by:

$$I_{Dodd,avg} = I_{Deven,avg} = I_{Dout,avg} = I_{out}$$

and the diodes are additionally selected based upon calculating rms diode currents, given by:

$$I_{Dodd,rms} = \sqrt{\frac{1}{1-d_1}}I_{out}$$

$$I_{Deven,rms} = \sqrt{\frac{1}{1-d_2}}I_{out}$$

further, the output diode is selected based upon calculating the rms diode current, given by:

$$I_{Dout,rms} = \sqrt{\frac{1}{1-d_2}}I_{out}$$

where N is an odd number, and given by:

$$I_{Dout,rms} = \sqrt{\frac{1}{1-d_1}}I_{out}$$

where N is an even number.

FIG. 12 depicts a method for providing non-isolated DC/DC power using integrated VM stages, according to one embodiment of the present invention. The method begins at 356 and comprises charging a first storage component and a second storage component from an input source 106 during a first mode of operation. The first storage component is electrically connected to the second storage component by a first VM stage. According to the method, the first mode of operation reverse biases the first VM stage. In an embodiment, the number of VM stages comprises N stages. In another embodiment, the charging occurs during a first mode of operation further described above with reference to FIGS. 9A-9C, and includes first storage component comprising inductor 124a of first boost stage 274, second storage component comprising inductor 124b of second boost stage 277, and further includes first VM stage 259. In an alternative embodiment, the first boost stage 274 is connected to a first input source 106 and the second boost stage 277 is connected to a second input source 290.

With further reference to FIG. 12, in another embodiment, a second VM stage 262 is included, and each of the first 259 and second 262 VM stages comprises a charge pump capacitor and a corresponding diode, and the method further comprises reverse biasing the diode in the first VM stage 259 during the first mode of operation such that the diode does not conduct and the charge pump capacitor does not discharge.

In an alternative embodiment, the charging occurs during a first mode of operation of the power converter 287 as illustrated by FIG. 10, and the current in the inductor 124 of the first boost stage 259 and the current of the inductor 124b of the second boost stage 277 each rise linearly. In an embodiment, the number of VM stages comprises N stages as described above with reference to FIG. 10. In yet another embodiment, the diodes of each VM stage of converter 287 are reverse biased and do not conduct. The voltages in the capacitors of each VM stage of converter 287 remain unchanged, and the output diode 167 is reverse biased, thus the load is supplied by the output capacitor 136. In another embodiment, the first boost stage 274 and the second boost stage 277 further comprise MOSFETs, and the storage components including first storage component comprising inductor 124a of first boost stage 259 and second storage component comprising inductor 124b of second boost stage 277 are selected such that the ripple current is between 20% and 40% of the output current.

Still referring to FIG. 12, the process continues at 359 with forward biasing the first VM stage 259 during a second mode of operation to discharge the first storage component comprising inductor 124a of first boost stage 274 through the forward biased first VM stage 259 and to reverse bias a second VM stage 262 electrically connected to the first VM stage 259. Forward biasing the first VM stage 259 during the second mode of operation reverse biases the diode of the second VM stage 262 to charge the charge pump capacitor of the first VM stage 259 and discharge the charge pump capacitor of the second VM stage 262. In another embodiment, input power provided by the first storage component comprising inductor 124a of first boost stage 274 is stored in the first VM stage 259 during the second mode of operation.

In an alternative embodiment, forward biasing occurs during a second mode of operation of the power converter 287 as illustrated by FIG. 10. All the diodes in the first 293 and third 299 VM stages, in other words, all of the odd numbered diodes, are forward biased and the current from inductor 124a of first boost stage 274 flows through the capacitor in each odd numbered VM stage, charging the odd numbered capacitors in the first 293 and third 299 VM stages, and discharging the even numbered capacitors in the second 296 and fourth 302 VM stages. If the number of VM stages is odd, then the output diode 167 is reverse biased and the load 112 is supplied by the output capacitor 136. However, if the number of VM stages is even, then the output diode 167 is forward biased charging the output capacitor 136 and supplying the load 112. In the particular case considered in FIG. 10, since there are four VM stages, the output diode 167 is forward biased.

With reference to FIG. 12, the next step occurs at 362 by forward biasing the second VM stage 262 during a third mode of operation to discharge the second storage component such as inductor 124b of second boost stage 277 through the forward biased second VM stage 262 and to reverse bias the first VM 259. The process concludes at 365 with supplying an output voltage to a load 112 by an output capacitor 136. The output capacitor 136 is electrically connected to the first 259 and second 262VM stages by output diode 167, which is forward biased during the third mode of operation for charging the output capacitor 136. In an embodiment, forward biasing the second VM stage 262 during the third mode of operation reverse biases the diode of the first VM stage 259 to charge the charge pump capacitor of the second VM stage 262 and discharge the charge pump capacitor of the first VM stage 259. In still another embodiment, input power provided by the second storage component comprising inductor 124 of second boost stage 277 is stored in the second VM stage 262 during the third mode of operation.

In an alternative embodiment, forward biasing the second VM stage 262 and supplying an output voltage occurs during a third mode of operation of the power converter 287 as illustrated by FIG. 10. The even numbered diodes of second 296 and fourth 302 VM stages are forward biased and the current from inductor 124b of second boost stage 277 flows through the capacitors of second 296 and fourth 302 VM stages charging the even numbered capacitors and discharging the odd numbered capacitors of first 293 and third 299 VM stages. If the number of VM stages is odd, then the output diode 167 is forward biased charging the output capacitor 136 and supplying the load 112. However, if the number of VM stages is even, then the output diode 167 is reverse biased and the load 112 is supplied by the output capacitor 136.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "and/or," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A system for providing uninterrupted high voltage DC power to a DC distribution network, the system comprising:
   one or more low voltage generation modules providing generated power; and
   a plurality of high gain DC/DC power converters receiving the generated power from the generation modules, wherein the power converters each comprise:
      a boost cell electrically connected to at least one of the generation modules for receiving a DC input voltage therefrom, the boost cell comprising a switch and a primary winding, the boost cell operating the switch according to a switching sequence to alternately energize the primary winding to the input voltage and to discharge the primary winding, the boost cell further comprising:
         a first boost segment performing a first sequence according to a first control signal, the first sequence comprising a first storing sequence and a first releasing sequence; and,
         a second boost segment electrically connected in parallel with the first boost segment and performing a second sequence according to a second control signal, the second sequence comprising a second storing sequence and a second releasing sequence;
      a voltage multiplier (VM) cell electrically connected to the boost cell, the VM cell comprising a secondary winding and a multiplier capacitor, the secondary winding of the VM cell coupled to the primary winding of the boost cell for charging the multiplier capacitor to a DC output voltage greater than the input voltage when the primary winding is energized and discharging the multiplier capacitor when the primary winding is discharged, the VM cell further comprising:
         a first VM segment electrically connected between the first and second boost segments and configured to receive energy from the first boost segment during the first storing sequence; and
         a second VM segment electrically connected between the first VM segment and the first boost segment and configured to receive energy from the second boost segment and from the first VM segment during the second releasing sequence; and
      an output capacitor electrically connected to the VM cell, the output capacitor being charged to the output voltage by the multiplier capacitor when the multiplier capacitor is discharged; and
   a DC distribution network receiving DC power via the output capacitor of each of the power converters for distribution, wherein the power converters are configured to provide high voltage DC power to the DC distribution network.

2. The system of claim 1, wherein the switching sequence comprises a storing sequence in which the switch is conducting for energizing the primary winding and a releasing sequence in which the switch is non-conducting for discharging the primary winding.

3. The system of claim 2, wherein the output capacitor charges during the releasing sequence, said charge based on current conducted by the boost cell and the charge provided by the multiplier capacitor.

4. The system of claim 2,
   wherein the first sequence is distinct from the second sequence.

5. The system of claim 4, wherein the first storing sequence includes the second releasing sequence, and the second storing sequence includes the first releasing sequence.

6. The system of claim 1, further comprising:
   a DC storage component;
   a DC conversion component; and
   a high power DC load component;
   wherein the DC distribution network further comprises a high voltage DC bus connecting the DC storage component, the DC conversion component, and the high power DC load component to the DC distribution network and to the AC grid network via a common connection.

7. A non-isolated DC/DC power converter providing high voltage gain using integrated voltage multiplier (VM) stages, the power converter comprising:
- a first boost stage performing a first sequence according to a first control signal, the first sequence comprising a first storing sequence and a first releasing sequence;
- a second boost stage electrically connected with the first boost stage and performing a second sequence according to a second control signal, the second sequence distinct from the first sequence and comprising a second storing sequence and a second releasing sequence;
- a first VM stage electrically connected in parallel between the first boost stage and the second boost stage, the first VM stage comprising a first diode and a first capacitor; and,
- a second VM stage electrically connected in series between the first diode and the first boost stage, the second VM stage comprising a second diode and a second capacitor;
- wherein the first VM stage receives energy from the first boost stage during the first storing sequence; and,
- wherein the second VM stage receives energy from the second boost stage and from the first capacitor of the first VM stage during the second releasing sequence.

8. The power converter of claim 7, wherein the first storing sequence includes the second releasing sequence, and wherein the second storing sequence includes the first releasing sequence.

9. The power converter of claim 7, wherein the second boost stage charges the second VM stage during the second storing sequence.

10. The power converter of claim 7, further comprising an output stage including an output capacitor and an output diode, wherein the output stage provides power to a load during the first releasing sequence and during the second releasing sequence.

11. The power converter of claim 7, wherein a power input is provided to the first boost stage and to the second boost stage by a single power source resulting in an interleaved power input to the first VM stage and to the second VM stage.

12. The power converter of claim 7, wherein the first boost stage further comprises a first storage component and a first switching component and wherein the second boost stage further comprises a second storage component and a second switching component.

13. The power converter of claim 12, wherein the storing and releasing sequences define a first mode of operation in which the first VM stage is reverse biased for charging the first storage component and the second storage component from an input source, a second mode of operation in which the first VM stage is forward biased for discharging the first storage component through the forward biased first VM stage and for reverse biasing the second VM stage electrically connected to the first VM stage, and a third mode of operation in which the second VM stage is forward biased for discharging the second storage component through the forward biased second VM stage and for reverse biasing the first VM stage.

14. The power converter of claim 12, wherein the storage components comprise inductors, and wherein the switching components comprise MOSFETs.

* * * * *